(12) United States Patent
Thom et al.

(10) Patent No.: US 12,118,197 B2
(45) Date of Patent: Oct. 15, 2024

(54) USER INTERFACE, PROGRAMMER AND/OR DEBUGGER FOR EMBEDDING AND/OR MODIFYING PROBLEMS ON QUANTUM PROCESSORS

(71) Applicant: D-WAVE SYSTEMS INC., Burnaby (CA)

(72) Inventors: Murray C. Thom, Vancouver (CA); Fiona L. Hanington, Vancouver (CA); Alexander Condello, Burnaby (CA); William W. Bernoudy, Vancouver (CA); Melody C. Wong, Vancouver (CA); Aidan P. Roy, Surrey (CA); Kelly T. R. Boothby, Vancouver (CA); Edward D. Dahl, Sudbury, MA (US)

(73) Assignee: D-WAVE SYSTEMS INC., Burnaby (CA)

( * ) Notice: Subject to any disclaimer, the term of this patent is extended or adjusted under 35 U.S.C. 154(b) by 0 days.

(21) Appl. No.: 18/205,379

(22) Filed: Jun. 2, 2023

(65) Prior Publication Data
US 2024/0118797 A1 Apr. 11, 2024

Related U.S. Application Data

(63) Continuation of application No. 17/855,095, filed on Jun. 30, 2022, now Pat. No. 11,704,012, which is a (Continued)

(51) Int. Cl.
*G06F 3/04847* (2022.01)
*G06F 3/04817* (2022.01)
(Continued)

(52) U.S. Cl.
CPC ...... *G06F 3/04847* (2013.01); *G06F 3/04817* (2013.01); *G06F 16/9024* (2019.01);
(Continued)

(58) Field of Classification Search
None
See application file for complete search history.

(56) References Cited

U.S. PATENT DOCUMENTS

| D478,912 S | 8/2003 | Johnson |
| D500,766 S | 1/2005 | Hanisch et al. |

(Continued)

FOREIGN PATENT DOCUMENTS

| CN | 304209863 | 9/2017 |
| CN | 305650200 | 3/2020 |

(Continued)

OTHER PUBLICATIONS

"Download Button Click Icon Icon Royalty-Free Vector Graphic." pixabay, published Sep. 14, 2016 (retrieved from the internet (Oct. 16, 2023) (year:2016).

(Continued)

*Primary Examiner* — William C Trapanese
(74) *Attorney, Agent, or Firm* — Cozen O'Connor

(57) ABSTRACT

A user interface (UI), data structures and algorithms facilitate programming, analyzing, debugging, embedding, and/or modifying problems that are embedded or to be embedded on an analog processor (e.g., quantum processor), increasing computational efficiency and/or accuracy of problem solutions. The UI provides graph representations (e.g., source graph, target graph and correspondence therebetween) with nodes and edges which may map to hardware components (e.g., qubits, couplers) of the analog processor. Characteristics of solutions are advantageously represented spatially associated (e.g., overlaid or nested) with characteristics of a problem. Characteristics (e.g., bias state) may be represented by color, pattern, values, icons. Issues (e.g., broken chains) may be detected and alerts provided. Problem representations may be modified via the UI, and a computer system may autonomously generate new instances of the problem (Continued)

representation, update data structures, embed the new instance and cause the new instance to be executed by the analog processor.

20 Claims, 10 Drawing Sheets

Related U.S. Application Data continuation of application No. 17/182,975, filed on Feb. 23, 2021, now Pat. No. 11,409,426.

(60) Provisional application No. 62/980,740, filed on Feb. 24, 2020.

(51) Int. Cl.
*G06F 16/901* (2019.01)
*G06N 10/00* (2022.01)
*G06T 11/20* (2006.01)

(52) U.S. Cl.
CPC ............ *G06N 10/00* (2019.01); *G06T 11/206* (2013.01); *G06T 2200/24* (2013.01)

(56) References Cited

U.S. PATENT DOCUMENTS

| | | |
|---|---|---|
| D511,524 S | 11/2005 | Retuta et al. |
| D541,810 S | 5/2007 | Cummins et al. |
| 7,533,068 B2 | 5/2009 | Maassen et al. |
| D597,101 S | 7/2009 | Chaudhri et al. |
| 7,624,088 B2 | 11/2009 | Johnson et al. |
| D626,131 S | 10/2010 | Kruzeniski et al. |
| 7,843,209 B2 | 11/2010 | Berkley |
| 7,870,087 B2 | 1/2011 | Macready et al. |
| 7,876,248 B2 | 1/2011 | Berkley et al. |
| 7,984,012 B2 | 7/2011 | Coury et al. |
| 8,073,808 B2 | 12/2011 | Rose |
| 8,098,179 B2 | 1/2012 | Bunyk et al. |
| 8,169,231 B2 | 5/2012 | Berkley |
| 8,174,305 B2 | 5/2012 | Harris |
| 8,190,548 B2 | 5/2012 | Choi |
| D661,701 S | 6/2012 | Brown et al. |
| 8,195,596 B2 | 6/2012 | Rose et al. |
| D677,274 S | 3/2013 | Phelan |
| D679,726 S | 4/2013 | Kobayashi |
| D681,053 S | 4/2013 | Okumura et al. |
| 8,421,053 B2 | 4/2013 | Bunyk et al. |
| D687,460 S | 8/2013 | Tyler et al. |
| D702,723 S | 4/2014 | Abratowski et al. |
| D705,255 S | 5/2014 | Gerssen et al. |
| 8,786,476 B2 | 7/2014 | Bunyk et al. |
| D712,433 S | 9/2014 | Okumura et al. |
| 8,854,074 B2 | 10/2014 | Berkley |
| D717,823 S | 11/2014 | Brotman et al. |
| D730,393 S | 5/2015 | Bray et al. |
| D736,792 S | 8/2015 | Brinda et al. |
| 9,129,224 B2 | 9/2015 | Lanting et al. |
| 9,178,154 B2 | 11/2015 | Bunyk |
| 9,183,508 B2 | 11/2015 | King |
| D747,736 S | 1/2016 | Bray et al. |
| D754,673 S | 4/2016 | Kim et al. |
| 9,361,169 B2 | 6/2016 | Berkley |
| D766,254 S | 9/2016 | Kawakami et al. |
| D771,126 S | 11/2016 | Cho et al. |
| 9,495,644 B2 | 11/2016 | Chudak et al. |
| 9,501,474 B2 | 11/2016 | Gopalakrishnan |
| D797,772 S | 9/2017 | Mizono et al. |
| D803,241 S | 11/2017 | Mizono et al. |
| 9,881,256 B2 | 1/2018 | Hamze et al. |
| D809,522 S | 2/2018 | Mizono et al. |
| D815,128 S | 4/2018 | Phillips et al. |
| D819,075 S | 5/2018 | Tsuji et al. |
| 10,031,887 B2 | 7/2018 | Raymond |
| D828,381 S | 9/2018 | Lee et al. |
| D835,139 S | 12/2018 | Li |
| D836,659 S | 12/2018 | Andrew |
| D843,392 S | 3/2019 | Timmer et al. |
| D846,587 S | 4/2019 | Behzadi et al. |
| 10,263,802 B2 | 4/2019 | Burns et al. |
| D862,482 S | 10/2019 | Shim et al. |
| D862,492 S | 10/2019 | Barni |
| D863,343 S | 10/2019 | Mazlish et al. |
| 10,467,545 B2 | 11/2019 | Harris |
| D874,495 S | 2/2020 | Miloseski et al. |
| 10,552,755 B2 | 2/2020 | Lanting et al. |
| D879,137 S | 3/2020 | Mizono et al. |
| 10,599,988 B2 | 3/2020 | Thom et al. |
| D881,903 S | 4/2020 | Lepine et al. |
| D882,583 S | 4/2020 | Dattilo-Green et al. |
| D888,727 S | 6/2020 | Yan |
| D888,728 S | 6/2020 | Yan |
| D888,757 S | 6/2020 | Yan |
| D888,758 S | 6/2020 | Yan |
| D889,485 S | 7/2020 | Yan |
| D895,673 S | 9/2020 | Lyons et al. |
| D910,691 S | 2/2021 | Kang |
| D914,701 S | 3/2021 | Al Majid et al. |
| D916,795 S | 4/2021 | Yu et al. |
| 11,100,416 B2 | 8/2021 | Lanting et al. |
| D940,744 S | 1/2022 | Sun et al. |
| D949,162 S | 4/2022 | Kim et al. |
| D954,088 S | 6/2022 | Chaudhri et al. |
| 11,372,527 B2 | 6/2022 | Boyagian et al. |
| D956,775 S | 7/2022 | O'Rourke et al. |
| D958,152 S | 7/2022 | Torres et al. |
| D967,124 S | 10/2022 | Luk et al. |
| D980,846 S | 3/2023 | Nook et al. |
| 2008/0052055 A1 | 2/2008 | Rose et al. |
| 2008/0218519 A1* | 9/2008 | Coury .................. G06T 11/206 345/440 |
| 2009/0241013 A1 | 9/2009 | Roetteler |
| 2014/0250288 A1 | 9/2014 | Roy |
| 2015/0032993 A1 | 1/2015 | Amin et al. |
| 2016/0321444 A1 | 11/2016 | Kim et al. |
| 2017/0068419 A1 | 3/2017 | Sundermeyer et al. |
| 2018/0024731 A1 | 1/2018 | Sanches et al. |
| 2018/0074693 A1 | 3/2018 | Jones et al. |
| 2018/0246848 A1 | 8/2018 | Douglass et al. |
| 2020/0233567 A1 | 7/2020 | Boyagian et al. |
| 2021/0263643 A1 | 8/2021 | Thom et al. |

FOREIGN PATENT DOCUMENTS

| | | |
|---|---|---|
| WO | 2005093649 A1 | 10/2005 |
| WO | 2006066415 A1 | 6/2006 |
| WO | 2007085074 A1 | 8/2007 |
| WO | 2012064974 A2 | 5/2012 |

OTHER PUBLICATIONS

"Vital Jiu Jitsu Gi Available." Fighter's shop Bull Terrier, published Sep. 29, 2019 (Retrieved from the Internet Aug. 16, 2022). Internet URL: <https://www.btfightgear.com/news-detail/1256> (Year: 2019).

Bocko et al., "Prospects for Quantum Coherent Computation Using Superconducting Electronics", IEEE Transactions on Applied Superconductivity, Aug. 27, 2014.

Bocko et al., "Prospects for Quantum Coherent Computation Using Superconducting Electronics," IEEE Transactions on Applied Superconductivity 7(2):3638-3641, Jun. 1997.

Chittineni et al., "Optimal Parameter Selection for Unsupervised Neural Network Using Genetic Algorithm," International Journal of Computer Science, Engineering and Applications (IJCSEA) 3(5):13-27, 2013.

Choi, Vicky. "Minor-embedding in adiabatic quantum computation: I. The parameter setting problem." arXiv:0804.4884v1. Apr. 30, 2008.

Clarke et al., "Superconducting quantum bits," Nature 453:1031-1042, Jun. 19, 2008.

Conlon, David "An Extremal Theorem in the Hypercube," The Electronic Journal of Combinations 17:1 (2010), 6 pages.

(56) References Cited

OTHER PUBLICATIONS

Daily Youth. "[Foxy] Universal Circle (Line) icon pack." Iconfinder, published Jul. 9, 2019 (Retrieved from the Internet Aug. 16, 2022). Internet URL: <https://www.iconfinder.com/iconsets/foxy-universal-circle-line> (Year: 2019).
Devoret et al., "Superconducting Circuits for Quantum Information: An Outlook", Science, Mar. 25, 2013.
Devoret et al., "Superconducting Qubits: A Short Review," arXiv:cond-mat/0411174v1, Nov. 7, 2004, 41 pages.
D-Wave Problem-Solving Handbook, User Manuel 09-1171A-A, Oct. 1, 2018, 114 pages.
Fresh Free Music. "Quick Tip—How to invert colors using photoshop." YouTube, published Jan. 10, 2014 (Retrieved from the Internet Aug. 17, 2022). Internet URL: <https://www.youtube.com/watch?v=Pgmm1q8VrtQ> (Year: 2014).
Friedman et al., "Quantum superposition of distinct macroscopic states," Nature 406:43-46, Jul. 6, 2000.
Gaitan, Frank, and Lane Clark. "Graph isomorphism and adiabatic quantum computing." Physical Review A 89.2 (2014): 022342. (Year: 2014).
Gambetta, et al., "IBM Unveils Beta of Next Generation Quantum Development Platform", Quantum Computing, Dec. 22, 2022, 8 pages.
Glover, et al., "Quantum Bridge Analytics I: A Tutorial on Formulating and Using QUBO Models", ECEE, College of Engineering and Applied Science, University of Colorado, Boulder, 46 pages.
Harris et al., "Experimental Demonstration of a Robust and Scalable Flux Qubit," arXiv:0909.4321v1, Sep. 24, 2009, 20 pages.
Harris et al., "Experimental Investigation of an Eight-Qubit Unit Cell in a Superconducting Optimization Processor," arXiv:1004.1628v2, Jun. 28, 2010, 16 pages.
Henry, James. "Circle button. "The Noun Project, published Feb. 17, 2018 (retrieved from the internet (Oct. 6, 2023), (year: 2018).
King, Andrew D., and Catherine C. McGeoch. "Algorithm engineering for a quantum annealing platform." arXiv preprint arXiv:1410.2628 (2014). (Year: 2014).
Mahasinghe, et al., "Solving the Hamiltonian Cycle Problem using a Quantum Computer", https://www.researchgate.net/publication/330377850, Conference Paper • Jan. 2019, 10 pages.
Makhlin et al., "Quantum-state engineering with Josephson-junction devices," arXIv:cond-mat/0011269v1, arXiv:cond-mat/0011269v1, Nov. 15, 2000.
Martinis, "Superconducting phase qubits," Quantum Inf Process 8:81-103, 2009.
Mooij et al., "Josephson Persistent-Current Qubit," Science 285:1036-1039, Aug. 13, 1999.
Non Final Office Action for U.S. Appl. No. 29/725,225, mailed Aug. 24, 2022, 10 pages.
Notice of Allowance for U.S. Appl. No. 17/855,095, mailed Nov. 10, 2022, 9 pages.
Orlando et al., "Superconducting persistent-current qubit," Physical Review B 60(22):15398-15413, Dec. 1, 1999.
Perdomo-Ortiz et al., "A Performance Estimator for Quantum Annealers: Gauge Selection and Parameter Setting.," arXiv:1503.01083v1 [quant-ph], Mar. 3, 2015, 10 pages.
Phillips, Geoff. "Annulus 4 ways." YouTube, published Apr. 28, 2019 (Retrieved from the Internet (Oct. 16, 2023), (Year:2019).
Pubbli. "72 social media icons new circle Line Flat—Vector, Black and white, transparent background." Pubbli, Published May 20, 2016 (Retrieved from the Internet Oct. 6, 2023). (Year:2016).
Restriction Requirement, mailed Jun. 14, 2022, for United States U.S. Appl. No. 29/725,225, Hanington, "Graphical User Interface and Icon for a Display Screen or Portion Thereof," 7 pages.
Smith et al., "A Practical Quantum Instruction Set Architecture", arXiv:1608.03355v2, Feb. 17, 2017.
Zagoskin et al., "Superconducting Qubits," arXiv:0805.0164v1, May 1, 2008.
Bian, et al., "The Ising Model: teaching an old problem new tricks", D-wave systems. 2 (year 2010), 32 pages.
Non-Final Office Action Issued in U.S. Appl. No. 29/902,114, mailed Oct. 24, 2023, 11 pages.

* cited by examiner

USER INTERFACE, PROGRAMMER AND/OR DEBUGGER FOR EMBEDDING AND/OR MODIFYING PROBLEMS ON QUANTUM PROCESSORS

BACKGROUND

Field

This disclosure generally relates to quantum processors, and in particular to systems and methods that facilitate the programming, analyzing, debugging, embedding, and/or modifying problems embedded or to be embedded on a quantum processor.

Quantum Devices

Quantum devices are structures in which quantum mechanical effects dominate. Quantum devices include circuits in which current transport is dominated by quantum mechanical effects. Such devices include spintronics, where electronic spin is used as a resource, and superconducting circuits. Both spin and superconductivity are quantum mechanical phenomena. Quantum devices can be used for measurement instruments, in computing machinery, and the like.

Quantum Computation

Quantum computation and quantum information processing are active areas of research and define classes of vendible products. A quantum computer is a system that makes direct use of at least one quantum-mechanical phenomenon, such as, superposition, tunneling, and entanglement, to perform operations on data. The elements of a quantum computer are not binary digits (bits) but typically are quantum binary digits or qubits. Quantum computers hold the promise of providing exponential speedup for certain classes of computation problems like simulating quantum physics. Useful speedup may exist for other classes of problems.

There are several types of quantum computers. An early proposal from Feynman in 1981 included creating artificial lattices of spins. More complicated proposals followed including a quantum circuit model, where logical gates are applied to qubits in a time ordered way. In 2000, a model of computing was introduced for solving satisfiability problems; based on the adiabatic theorem this model is called adiabatic quantum computing. This model is believed useful for solving hard optimization problems and potentially other problems. Further details on adiabatic quantum computing systems, methods, and apparatus are described in, for example, U.S. Pat. Nos. 7,135,701; and 7,418,283.

Quantum Annealing

Quantum annealing is a computation method that may be used to find a low-energy state, typically preferably the ground state, of a system. Similar in concept to classical simulated annealing, the method relies on the underlying principle that natural systems tend towards lower energy states because lower energy states are more stable. However, while classical annealing uses classical thermal fluctuations to guide a system to a low-energy state and ideally its global energy minimum, quantum annealing may use quantum effects, such as quantum tunneling, as a source of delocalization to reach a global energy minimum more accurately and/or more quickly than classical annealing. Thermal effects and other noise may be present in quantum annealing, hence the final low-energy state may not be the global energy minimum.

Adiabatic quantum computation may be considered a special case of quantum annealing for which the system, ideally, begins and remains in its ground state throughout an adiabatic evolution. Thus, quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of delocalization, sometimes called disorder, during the annealing process. The computational problem is encoded in a Hamiltonian $H_P$, and the method introduces quantum effects by adding a delocalization Hamiltonian H D that does not commute with $H_P$. An example case is:

$$H_E \propto A(t)H_D + B(t)H_P \tag{1}$$

where A(t) and B(t) are time dependent envelope functions. For example, A(t) changes from a large value to substantially zero during the evolution. The delocalization may be removed by removing $H_D$ (i.e., reducing A(t)). Quantum annealing is similar to adiabatic quantum computation in that the system starts with an initial Hamiltonian and evolves through an evolution Hamiltonian to a final "problem" Hamiltonian $H_P$ whose ground state encodes a solution, or approximate solution, to the problem. If the evolution is slow enough, the system may settle in the global minimum (i.e., the exact solution), or in a local minimum close in energy to the exact solution. The performance of the computation may be assessed via the residual energy (e.g., difference from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

BRIEF SUMMARY

A user interface (UI), data structures and algorithms facilitate programming, analyzing, debugging, embedding, and/or modifying problems that are embedded or are to be embedded on an analog processor (e.g., quantum processor), increasing computational efficiency and/or accuracy of problem solutions. The UI provides graph representations (e.g., source graph, target graph and correspondence therebetween) with nodes and edges which may map to hardware components (e.g., qubits, couplers) of the analog processor. Characteristics of solutions are advantageously represented spatially associated (e.g., overlaid or nested) with characteristics of a problem. Characteristics (e.g., bias state) may be represented by color, pattern, values, icons. Issues (e.g., broken chains) may be detected and alerts provided. Problem representations may be modified via the UI, and a computer system may autonomously generate new instances of the problem representation, update data structures, embed the new instance and cause the new instance to be executed by the analog processor.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

Figure 6:
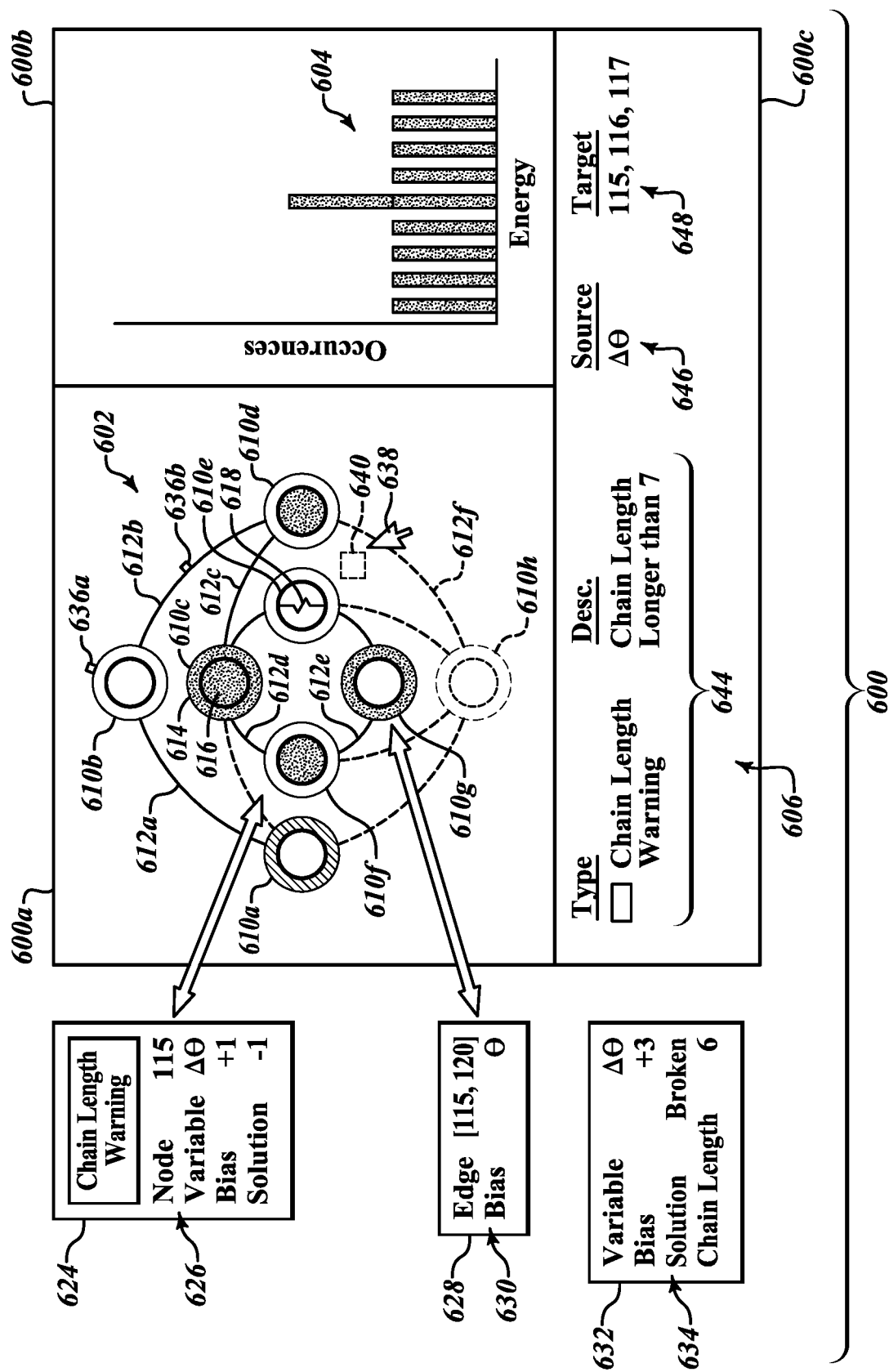

FIG. 6 is a schematic diagram of an exemplary user interface including a logical problem or source graph representation of an instance of a problem and solution to the problem presented in a first panel of a window, a plot of energy level occurrences that represents a solution to the problem presented in a second panel of the window, and a console or dashboard presented in a third panel of the window, in accordance with the present systems, devices, methods, and articles.

Figure 7A:
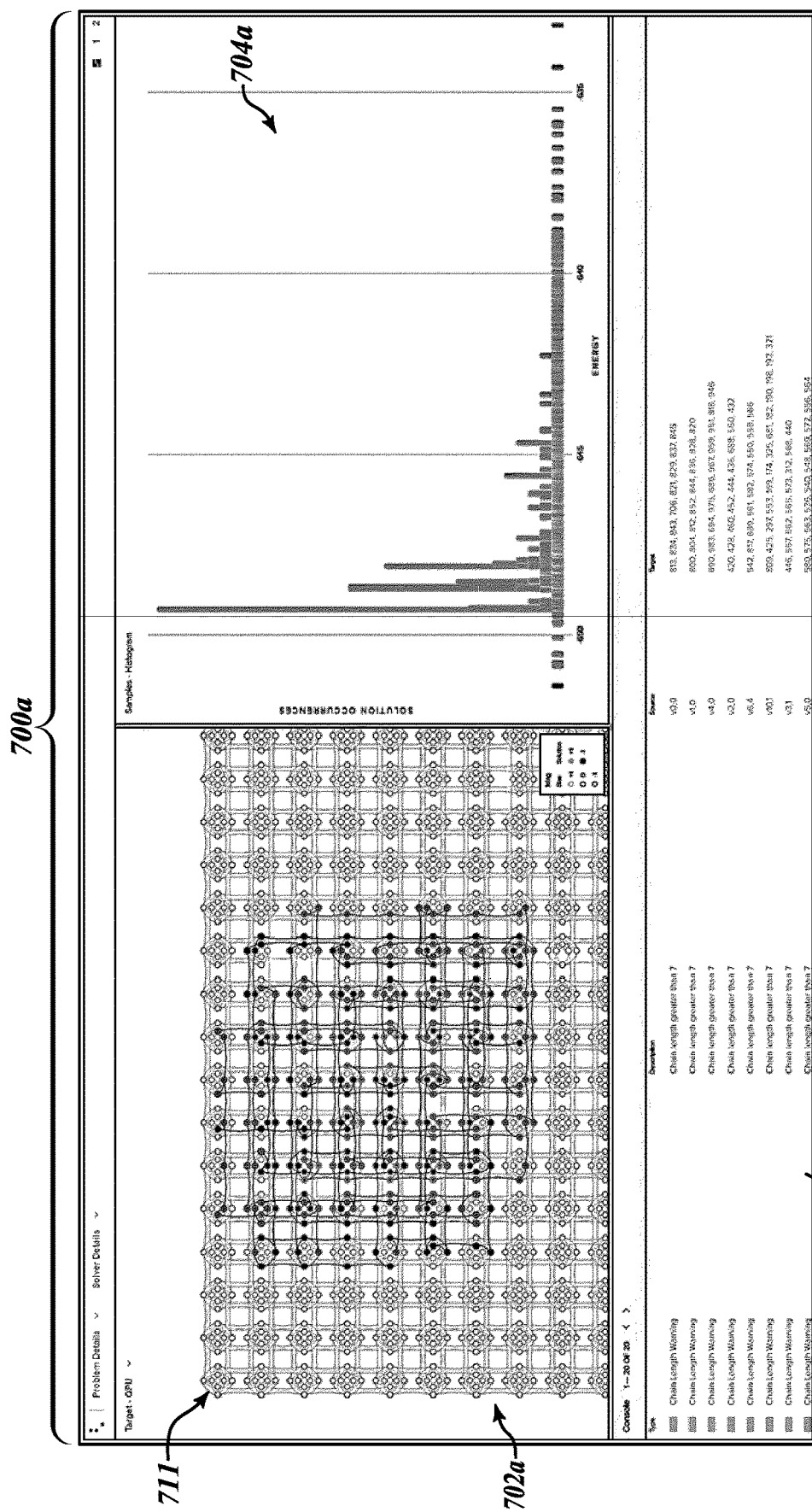

FIG. 7A is a screen print of an exemplary user interface including a quantum processor or target graph representation of an instance of a problem and solution to the problem presented in a first panel of a window, a plot of energy level occurrences that represents a solution to the problem presented in a second panel of the window, and a console or dashboard presented in a third panel of the window, in accordance with the present systems, devices, methods, and articles.

Figure 7B:
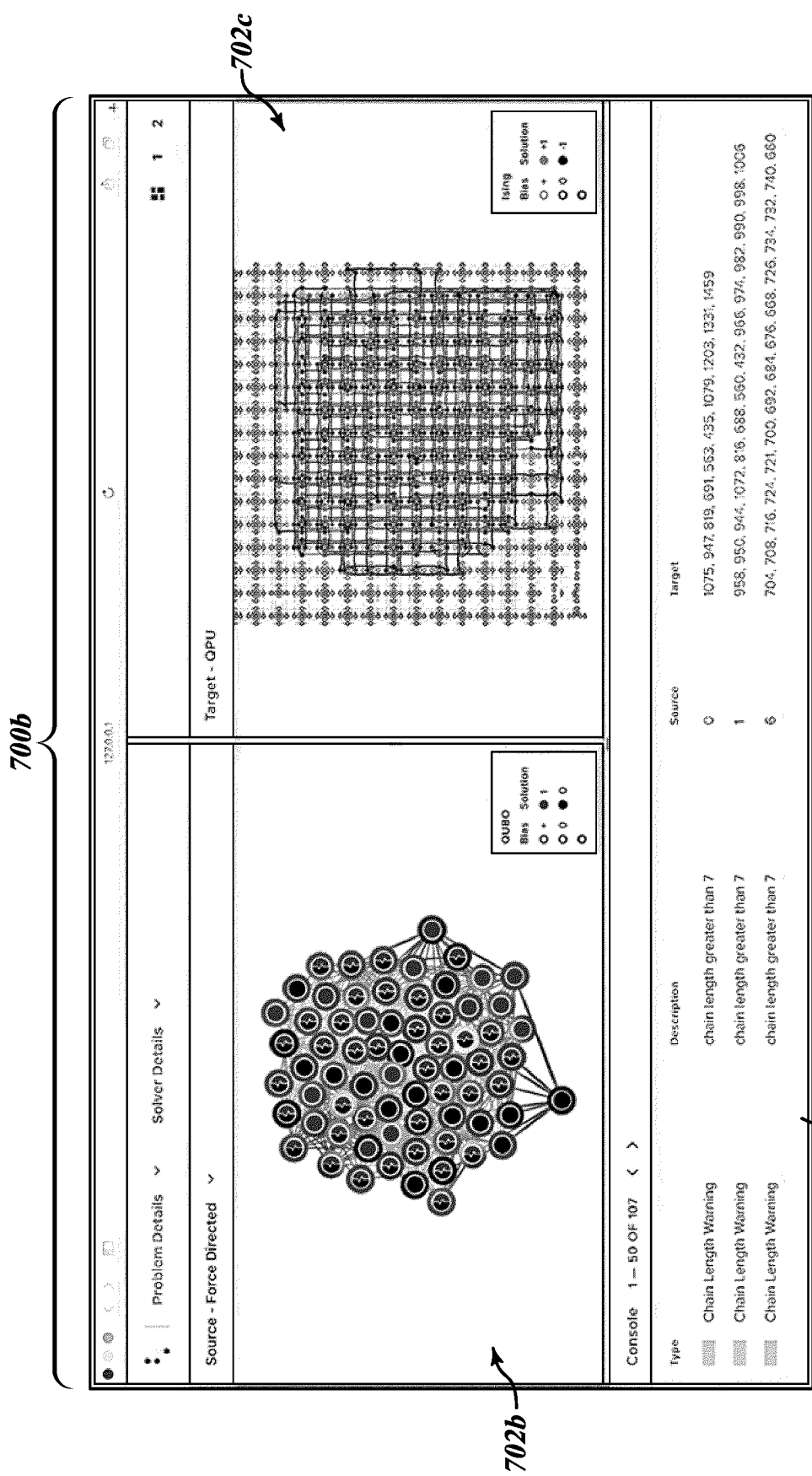

FIG. 7B is a screen print of an exemplary user interface including a logical problem or source graph representation of an instance of a problem and solution to the problem presented in a first panel of a window, and a quantum processor or target graph representation of the instance of the problem and solution to the problem presented in a second panel of the window, and a console or dashboard presented in a third panel of the window in accordance with the present systems, devices, methods, and articles.

Figure 7C:
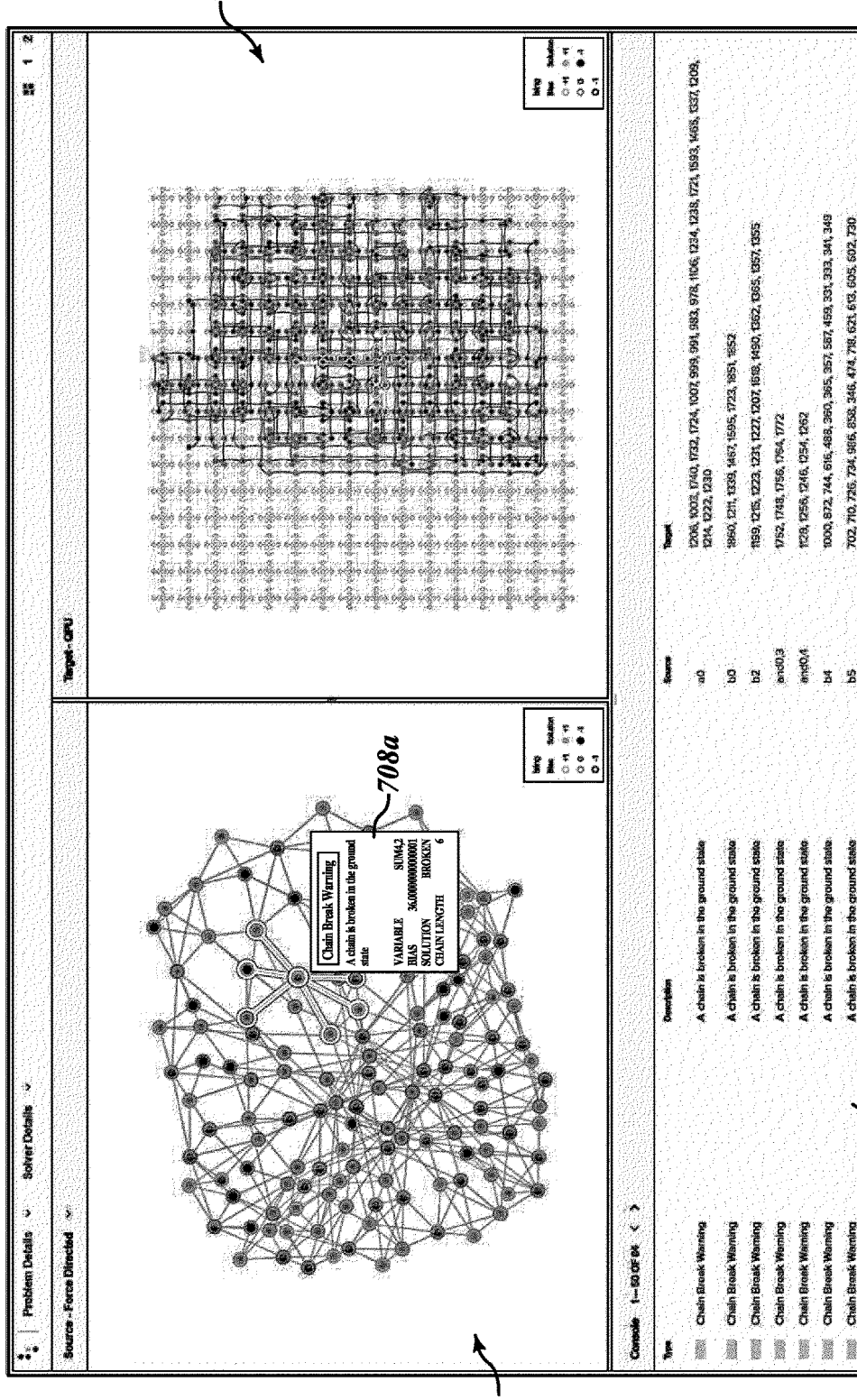

FIG. 7C is a screen print of an exemplary user interface including a logical problem or source graph representation of an instance of a problem and solution to the problem presented in a first panel of a window, and a quantum processor or target graph representation of the instance of the problem and solution to the problem presented in a second panel of the window, and a console or dashboard presented in a third panel of the window in accordance with the present systems, devices, methods, and articles.

Figure 7D:
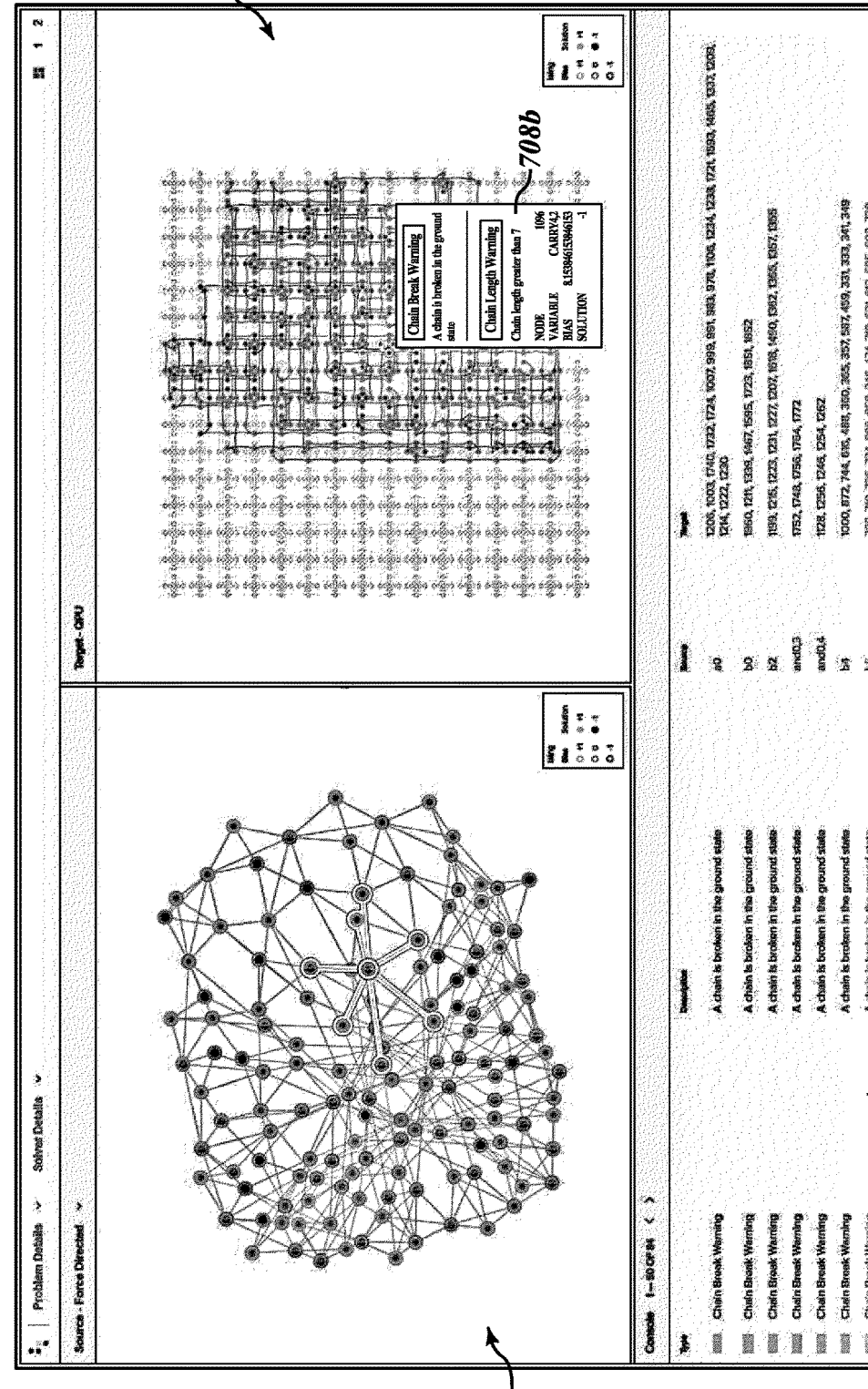

FIG. 7D is a screen print of an exemplary user interface including a logical problem or source graph representation of an instance of a problem and solution to the problem presented in a first panel of a window, and a quantum processor or target graph representation of the instance of the problem and solution to the problem presented in a second panel of the window, and a console or dashboard presented in a third panel of the window in accordance with the present systems, devices, methods, and articles.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, couplers, and control systems including microprocessors and drive circuitry have not been shown or described in detail to avoid unnecessarily obscuring descriptions of the embodiments of the present methods. Throughout this specification and the appended claims, the words "element" and "elements" are used to encompass, but are not limited to, all such structures, systems, and devices associated with quantum processors, as well as their related programmable parameters.

Unless the context requires otherwise, throughout the specification and claims which follow, the word "comprising" is synonymous with "including," and is inclusive or open-ended (i.e., does not exclude additional, unrecited elements or method acts), as are variations thereof, such as, "comprises" and "comprise."

Reference throughout this specification to "one embodiment" "an embodiment", "another embodiment", "one example", "an example", "another example", "one implementation", "another implementation", or the like means that a particular referent feature, structure, or characteristic described in connection with the embodiment, example, or implementation is included in at least one embodiment, example, or implementation. Thus, the appearances of the phrases "in one embodiment", "in an embodiment", "another embodiment" or the like in various places throughout this specification are not necessarily all referring to the same embodiment, example, or implementation. Furthermore, the particular features, structures, or characteristics may be combined in any suitable manner in one or more embodiments, examples, or implementations.

As used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its non-exclusive sense, i.e., "and/or" unless the content clearly dictates otherwise.

As used in this specification and the appended claims, the term "chain" refers to a set of qubits that are mapped to a single variable to allow for a problem to be embedded despite limited connectivity between qubits.

As used in this specification and the appended claims, the term "broken chain" refers to a set of qubits that are mapped to a single variable (i.e., a chain) that have different values after annealing. Chains break, for example, when the system does not find a single value, typically because chains are too long and/or coupler strength is insufficient to force all the qubits in the chain to take on the same value.

The headings provided herein are for convenience only and do not interpret the scope or meaning of the embodiments.

Figure 1:
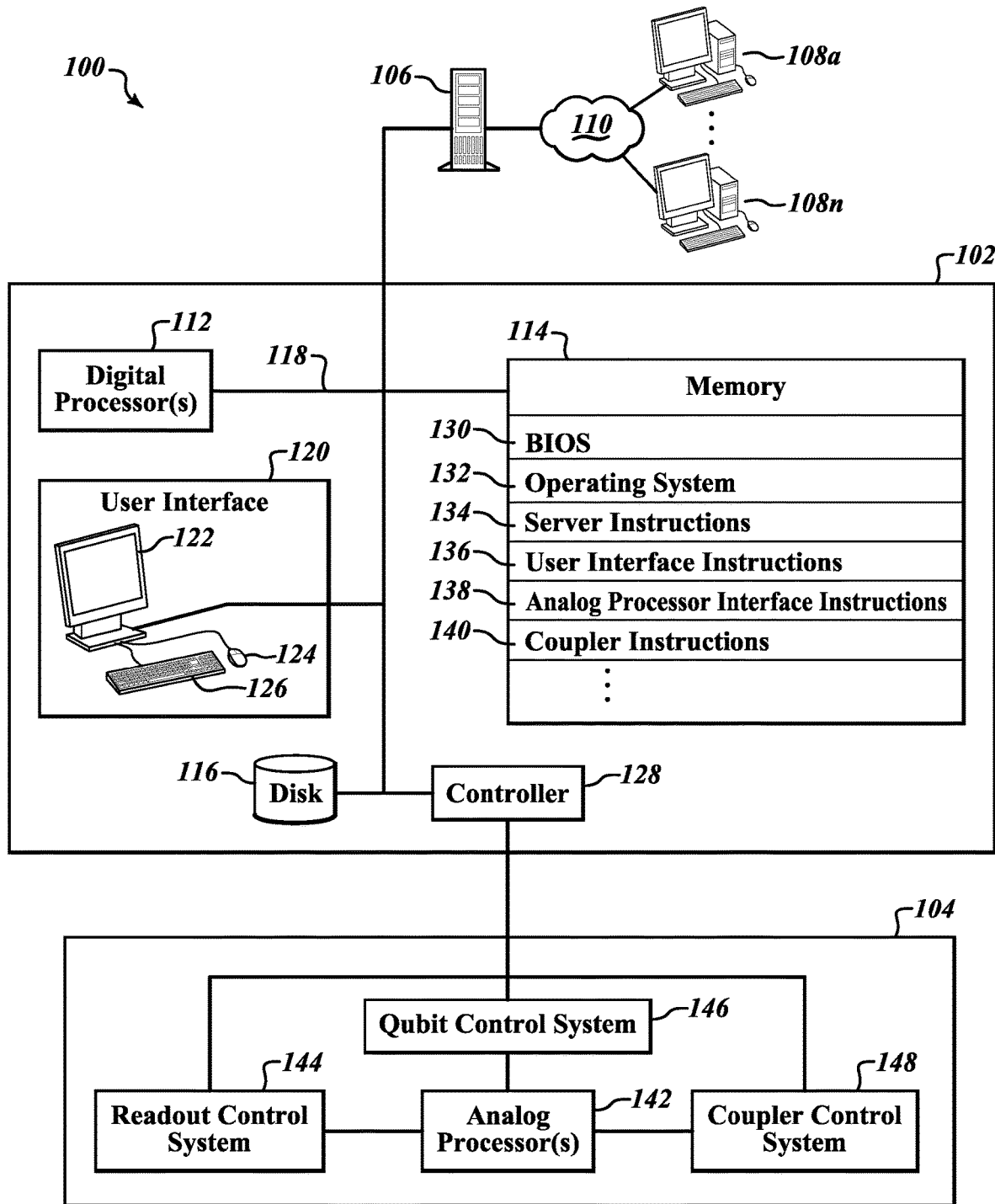
FIG. 1 is a schematic diagram that illustrates an exemplary computing environment including a digital computer system and an analog computer system to which the digital computer system interfaces, and optionally a server computer system and client computer systems, in accordance with the present systems, devices, methods, and articles.

FIG. 1 illustrates a computing environment 100, according to at least one illustrated implementation.

The computing environment 100 includes a digital computer system 102 and an analog computer system 104, the digital computer system 102 communicatively coupled and interfaced to the analog computer system 104. The digital computer system 102 may be used to perform various digital processing tasks described in the present systems, devices, methods, and articles, including providing a user interface for analyzing, debugging, embedding, and modifying problems executed via the analog computer system 104. As described in more detail below, the analog computer system 104 may, for example, take the form of a quantum computer system. The computing environment 100 optionally includes a server computer system 106 and one or more client computer systems 108a-108n (only two illustrated, collectively 108), the client computer systems 108 communicatively coupled to the server computer system 106, for example via a network 110. The client computer systems 108 may be remotely located from the digital computer system 102 and/or the analog computer system 104, which may advantageously allow remote users to access the resources of the analog computer system 104. In at least some implementations, the analog computer system 104 may include one or more superconducting quantum processors, which are typically operated at very cold temperatures (e.g., a few degrees K, or less than 1 degree K). Providing remote access to a superconducting quantum processor for problem solving, for example in a cloud computing or via an SaaS model may be particularly advantageous.

Digital computer system 102 will at times be referred to in the singular herein, but this is not intended to limit the application to a single digital computer system. Likewise, the analog computer system 104 will at times be referred to in the singular herein, but this is not intended to limit the application to a single analog computer system.

Digital computer system 102 may include one or more digital processors 112, one or more nontransitory processor-readable media, for example system memory 114 and/or other non-volatile memory 116, and at least one system bus 118 that couples various system components, including system memory 114 to the processor(s) 112.

Digital computer system 102 may include a user input/output subsystem 120. In some implementations, the user input/output subsystem 120 includes one or more user input/output components such as a display 122, mouse 124, and/or keyboard 126.

The digital processor(s) 112 may take the form of any suitable logic processing unit, for example one or more central processing units ("CPUs"), graphics processing units ("GPUs"), digital signal processors ("DSPs"), application-specific integrated circuits ("ASICs"), programmable gate arrays ("FPGAs"), programmable logic controller (PLC), etc., which execute instructions or logic. The processor(s) 112 may be used to perform classical digital processing tasks described in the present systems, devices, methods, and articles. Unless described otherwise, the construction and operation of the various blocks shown in FIG. 1 are of conventional design. As a result, such blocks need not be described in further detail herein, as they will be understood by those skilled in the relevant art.

System bus 118 can employ any known bus structures or architectures, including a memory bus with a memory controller, a peripheral bus, a local bus, power bus, instruction bus, data bus.

System memory 114 may include non-transitory processor-readable media, for example non-volatile memory, such as read-only memory ("ROM"), static random access memory ("SRAM"), Flash NAND; and volatile memory such as random access memory ("RAM") (not shown). System memory 114 stores processor-executable instructions and data. For example, a basic input/output system ("BIOS") 130 can be stored in ROM and contains basic routines that cause transfer of information between elements within digital computer system 102, such as during startup or booting.

Non-volatile memory 116 may take a variety of forms, including: a hard disk drive for reading from and writing to a hard disk (e.g., magnetic disk), an optical disk drive for reading from and writing to removable optical disks, and/or a solid state drive (SSD) for reading from and writing to solid state media (e.g., NAND-based Flash memory). The optical disk can be a CD-ROM or DVD, while the magnetic disk can be a magnetic floppy disk or diskette. Non-volatile memory 116 may communicate with digital processor via system bus 118 and may include appropriate interfaces or controllers 128 coupled to system bus 118. Non-volatile memory 116 may serve as long-term storage for processor- or computer-readable instructions, data structures, or other data (sometimes called program modules) for digital computer system 102.

Although digital computer system 102 has been described as employing hard disks, optical disks and/or magnetic disks, those skilled in the relevant art will appreciate that other types of non-volatile computer-readable media may be employed, such a magnetic cassettes, flash memory cards, Flash, ROMs, smart cards, etc. Those skilled in the relevant art will appreciate that some computer architectures conflate volatile memory and non-volatile memory. For example, data in volatile memory can be cached to non-volatile memory, or a solid-state disk can employ integrated circuits to provide non-volatile memory. Some computers place data traditionally stored on disk in memory. As well, some media that are traditionally regarded as volatile can have a non-volatile form, e.g., Non-Volatile Dual In-line Memory Module variation of Dual In-line Memory Modules.

Various processor- or computer-readable instructions, data structures, or other data can be stored in system memory 114. For example, system memory 114 may store an operating system 132, and a set of processor- or computer-readable server instructions 134. In some implementations, operating system 132 may provide general instructions that implement the operating system of the digital computer system 102, for example some form of the Microsoft Windows operation system, Apple Macintosh operating system (macOS), or Linux operating system. In some implementations, server instructions 134 includes instruction for communicating with remote clients and scheduling use of resources including resources on the digital computer system 102 and analog computer 104. For example, a Web server application and/or Web client or browser application for permitting digital computer system 102 to exchange data with client computer systems 108a-108n via the network 110, for instance the Internet, corporate Intranets, or other networks, as well as with other server applications executing on server computers 106.

In some implementations, system memory 114 may store processor- or computer-readable user interface instructions 136 to provide a user interface to facilitate programming, analyzing, debugging, embedding, and/or modifying of problems in conjunction with the analog computer 104. In accordance with the present systems and methods, system memory 114 may also store a set of analog computer interface instructions 138 to interact with the analog computer 104 to autonomously perform programming, analysis, debugging, embedding, modifying and/or execution of problems with the analog computer 104.

In some implementations, system memory 114 stores coupler instructions 140 to augment the analog computer interface instructions 138. Some examples of the coupler instructions 140 allow the digital computer system 102 to receive information about the analog computer system 104 and various components thereof, as well as to program (e.g., embed problems) in the analog computer system 104 and various components thereof.

While shown in FIG. 1 as being stored in system memory 114, the modules shown and other data can also be stored elsewhere including in non-volatile memory 116.

Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like, which when properly configured or programmed form special purpose machines, and/or maybe communicatively coupled to and control an analog computer, for instance a quantum computer.

Analog computer system 104 can, for example, take the form of a quantum computer system from D-Wave Systems, Inc., for example the D-Wave One system, the D-Wave Two system, the D-Wave 2X system, the D-Wave 2000Q system, or the D-Wave Advantage system and may employ one or more quantum processors, e.g., the D-Wave 512-qubit processor, the D-Wave 1000-qubit processor, the D-Wave 2048-qubit processor, or the D-Wave 5000+-qubit processor.

Analog computer system 104 can be provided in an isolated environment (not shown). For example, where analog computer system 104 is a quantum computer system, the environment shields the internal elements of the quantum computer system from heat, magnetic fields, and the like. Analog computer system 104 includes one or more analog processor(s) 142.

Figure 2:
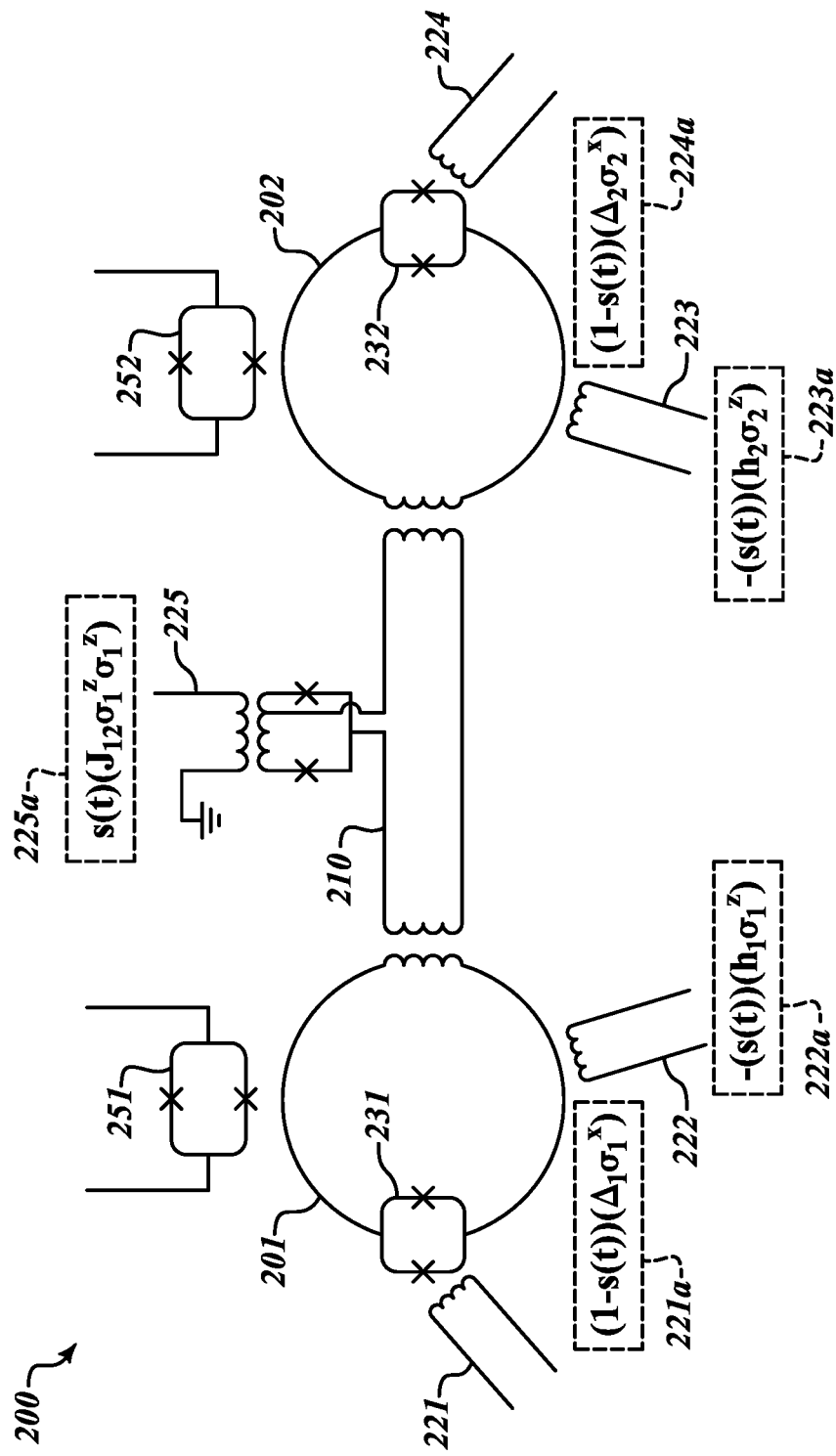
FIG. 2 is a schematic diagram that illustrates a portion of an exemplary an analog processor of the analog computer system of FIG. 1, in the form of a superconducting quantum processor, in accordance with the present systems, devices, methods, and articles.

FIG. 2 illustrates an example of an analog processor 142 in the form of a portion of a quantum processor 200, according to at least one implementation. The quantum processor 200 can include a plurality of programmable elements, for example a plurality of qubits 201, 202 (only two shown), a plurality of couplers 210 (only one shown), and other devices. The qubits 201, 202 are read via readout out system 144 (FIG. 1). These results are fed to sets of processor- or computer-readable instructions in digital computer system 102 including server instructions 134, user interface instructions 136, analog computer interface instructions 138, coupler instructions 140, or other instructions stored in system memory 114. The results can be returned over a network, other communications channels, or the like.

Returning to FIG. 1, the qubits 201, 202 (FIG. 2) are controlled via qubit control system 146. The couplers 210 (FIG. 2) are controlled via coupler control system 148. In some implementations, qubit control system 146 and coupler control system 148 are used to implement quantum annealing as described herein on analog processor 104, in the form of the quantum processor 200 (FIG. 2).

Certain computations may be performed by analog computer system 104 at the instruction of digital computer system 102, as described in greater detail herein.

In some implementations, digital computer system 102 can operate in a networking environment using logical connections to at least one client computer system. In some implementations, digital computer system 102 is coupled via logical connections to at least one database system, for example with data stored on non-volatile memory 116. These logical connections may be formed using any means of digital communication, for example, through a network, such as a local area network ("LAN") or a wide area network ("WAN") including, for example, the Internet.

The networking environment may include wired or wireless enterprise-wide computer networks, intranets, extranets, and/or the Internet. Other implementations may include other types of communication networks such as telecommunications networks, cellular networks, paging networks, and other mobile networks. The information sent or received via the logical connections may or may not be encrypted. When used in a LAN networking environment, digital computer system 102 may be connected to the LAN through an adapter or network interface card ("NIC") (communicatively linked to system bus 118). When used in a WAN networking environment, digital computer system 102 may include an interface and modem (not shown), or a device such as NIC, for establishing communications over the WAN. Non-networked communications may additionally, or alternatively, be employed.

The present systems and methods can also be practiced in distributed computing environments (including cloud distributed environments), where tasks or sets of processor-readable instructions are performed or executed by remote processing devices, which are linked through a communications network 110. In a distributed computing environment, computer- or processor-readable instructions (sometimes known as program modules) may be located in both local and remote memory storage devices (e.g., memory 114, other non-volatile memory 116).

FIG. 2 shows a portion of an exemplary superconducting quantum processor 200 designed for quantum annealing (and/or adiabatic quantum computing) where components may be used to implement the present systems and devices. As previously noted, the superconducting quantum processor 200 can be an implementation of analog processor 104 (FIG. 1).

The portion of superconducting quantum processor 200 shown in FIG. 2 includes two superconducting qubits 201 and 202. Quantum processor 200 also includes a coupler 210 that provides a tunable $\sigma_i^z \sigma_j^z$ coupling (diagonal coupling) between qubits 201 and 202. The diagonal coupling by coupler 210 provides 2-local interaction (i.e., pairwise interaction between qubits 201 and 202).

There are various implementations of solid-state qubits based on circuits of superconducting materials. There are two superconducting effects that underlie how superconducting qubits operate: magnetic flux quantization, and Josephson tunneling.

Flux is quantized because electrical charge carriers accrue a topological phase when passing around a conductive loop threaded by magnetic flux. For superconducting loops, the charge carriers are pairs of electrons called Cooper pairs. Quantum mechanics dictates that the Cooper pairs accrue a phase that is an integer multiple of $2\pi$. This then constrains the allowed flux in the loop. The flux is quantized. The current in the loop is governed by a single wave function and, for the wave function to be single-valued at any point in the loop, the flux within it is quantized.

Josephson tunneling is the process by which Cooper pairs cross an interruption, such as an insulating gap of a few nanometers, between two superconducting electrodes. The current crossing the interruption is dependent on the phase difference between the two populations of Cooper pairs in the electrodes.

Superconducting effects can be present in different configurations, and can give rise to different types of superconducting qubits including flux, phase, charge, and hybrid qubits. These different types of qubits depend on the topology of the loops, placement of the Josephson junctions, and the physical parameters of the parts of the circuits, such as, inductance, capacitance, and Josephson junction critical current.

A superconducting quantum processor may include a number of superconducting qubits and associated local bias devices, and a number of couplers (coupling devices) that provide communicative coupling between qubits. In one implementation, the superconducting qubit includes a superconducting loop interrupted by a Josephson junction. The ratio of the inductance of the Josephson junction to the geometric inductance of the superconducting loop can be expressed as $2\pi L I_C/\Phi_0$ (where L is the geometric inductance, $I_C$ is the critical current of the Josephson junction, and $\Phi_0$ is the flux quantum). The inductance and the critical current can be selected, adjusted, or tuned, to increase the ratio of the inductance of the Josephson junction to the geometric inductance of the superconducting loop, and to cause the qubit to be operable as a bistable device. In some implementations, the ratio of the inductance of the Josephson junction to the geometric inductance of the superconducting loop of a qubit is approximately equal to three.

In one implementation, the superconducting coupler includes a superconducting loop interrupted by a Josephson junction. The inductance and the critical current can be selected, adjusted, or tuned, to decrease the ratio of the inductance of the Josephson junction to the geometric inductance of the superconducting loop, and to cause the coupler to be operable as a monostable device. In some implementations, the ratio of the inductance of the Josephson junction to the geometric inductance of the superconducting loop of a coupler is approximately equal to, or less than, one.

Further details and embodiments of exemplary quantum processors that may be used in conjunction with the present systems and devices are described in, for example, U.S. Pat. Nos. 7,533,068; 8,008,942; 8,195,596; 8,190,548; and 8,421,053.

In accordance with some implementations of the present systems, devices, articles, and methods, a quantum processor may be designed to perform quantum annealing and/or adiabatic quantum computation. An evolution Hamiltonian is proportional to the sum of a first term proportional to the problem Hamiltonian and a second term proportional to the delocalization Hamiltonian. A typical evolution may be represented by Equation (1), rewritten here as Equation (2):

$$H_E \propto A(t)H_D + B(t)H_P \quad (2)$$

where $H_P$ is the problem Hamiltonian, $H_D$ is the delocalization Hamiltonian, $H_E$ is the evolution or instantaneous Hamiltonian, and A(t) and B(t) are examples of evolution coefficients that control the evolution. In general, evolution coefficients vary between 0 and 1 inclusive. In some implementations, a time varying envelope function is placed on the problem Hamiltonian.

A common delocalization Hamiltonian is shown in Equation (3):

$$H_D \propto -\frac{1}{2}\sum_{i=1}^{N}\Delta_i \sigma_i^x \quad (3)$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms.

A common problem Hamiltonian includes first component proportional to diagonal single qubit terms and a second component proportional to diagonal multi-qubit terms. The problem Hamiltonian, for example, may be of the form:

$$H_P \propto -\frac{\varepsilon}{2}\left[\sum_{i=1}^{N}h_i\sigma_i^z + \sum_{j>i}^{N}J_{ij}\sigma_i^z\sigma_j^z\right] \quad (4)$$

where N represents the number of qubits, $\sigma_i^z$ is the Pauli z-matrix for the $i^{th}$ qubit, $h_i$ are dimensionless local fields for the qubits, $J_{i,j}$ are couplings between qubits, and $\varepsilon$ is a characteristic energy scale for $H_P$.

Here, $\sigma_i^z$ and $\sigma_i^z\sigma_j^z$ terms are examples of "diagonal" terms. The former is a single qubit term and the latter a two qubit term. Throughout this specification, the terms "problem Hamiltonian" and "final Hamiltonian" are used interchangeably. Hamiltonians such as $H_D$ and $H_P$ in Equations (3) and (4), respectively, may be physically realized in a variety of different ways. A particular example is realized by an implementation of superconducting qubits as described below.

While the portion of quantum processor 200 shown in FIG. 2 includes only two qubits 201, 202 and one coupler 210, those of skill in the art will appreciate that quantum processor 200 may include any number of qubits and any number of couplers coupling information between pairs of the qubits.

The portion of quantum processor 200 shown in FIG. 2 may be implemented in order to physically realize quantum annealing and/or adiabatic quantum computing. Quantum processor 200 includes a plurality of interfaces 221-225 (e.g., programming interfaces, readout interfaces) that are used to configure and control the state of quantum processor 200. Each of interfaces 221-225 may be realized by a respective inductive coupling structure, as illustrated, as part of a programming subsystem and/or an evolution subsystem. Such a programming subsystem and/or evolution subsystem may be separate from quantum processor 200, or it may be included locally (i.e., on-chip with quantum processor 200) as described in, for example, U.S. Pat. Nos. 7,876,248 and 8,035,540.

In the operation of quantum processor 200, interfaces 221 and 224 may each be used to couple a flux signal into a respective compound Josephson junction 231 and 232 of qubits 201 and 202, thereby realizing a tunable tunneling term (the $\Delta_i$ term) in the delocalization Hamiltonian. This coupling provides the off-diagonal $\sigma^x$ terms of the Hamiltonian described by Equation (3) and these flux signals are examples of "delocalization signals".

Similarly, interfaces 222 and 223 may each be used to apply a flux signal into a respective qubit loop of qubits 201 and 202, thereby realizing the $h_i$ terms, or local bias terms, in the problem Hamiltonian. This coupling provides the diagonal $\sigma^z$ terms of Equation (4). Furthermore, interface 225 may be used to couple a flux signal into coupler 210, thereby realizing the $J_{ij}$ terms in the problem Hamiltonian. This coupling provides the 2-local ($\sigma^z_i \sigma^z_j$) terms of Equation (4). As described herein, a hybrid computer can create, and make use of, a greater than 2-local diagonal coupling between three or more qubits, for example a 3-local interaction or a higher-order interaction.

The contribution of each of interfaces 221-225 to the evolution Hamiltonian is indicated in boxes 221a-225a, respectively. As shown, in the example illustrated in FIG. 2, the boxes 221a-225a are elements of a time-varying Hamiltonian for quantum annealing and/or adiabatic quantum computing.

Throughout this specification and the appended claims, the term "quantum processor" is used to generally describe a collection of physical qubits (e.g., qubits 201 and 202) and couplers (e.g., coupler 210). The physical qubits 201 and 202 and the coupler 210 are referred to as the "programmable elements" of the quantum processor 200a and their corresponding parameters (e.g., the qubit $h_i$ values and the coupler $J_{ij}$ values) are referred to as the "programmable parameters" of the quantum processor. In the context of a quantum processor, the term "programming subsystem" is used to generally describe the interfaces (e.g., "programming interfaces" 222, 223, and 225) used to apply the programmable parameters (e.g., the $h_i$ and $J_{ij}$ terms) to the programmable elements of the quantum processor 200 and other associated control circuitry and/or instructions.

As previously described, the programming interfaces of the programming subsystem may communicate with other subsystems which may be separate from the quantum processor or may be included locally on the processor. As described in more detail later, the programming subsystem may receive programming instructions in a machine language of the quantum processor and execute the programming instructions to program the programmable elements in accordance with the programming instructions. Similarly, in the context of a quantum processor, the term "evolution subsystem" generally includes the interfaces used to evolve the programmable elements of the quantum processor 200 and other associated control circuitry and/or instructions (e.g., "evolution interfaces" 221 and 224). For example, the evolution subsystem may include annealing signal lines and their corresponding interfaces (221, 224) to the qubits (201, 202).

Quantum processor 200 also includes readout devices 251 and 252, where readout device 251 is associated with qubit 201, and readout device 252 is associated with qubit 202. In some implementations, such as the example implementation shown in FIG. 2, each of readout devices 251 and 252 includes a direct current superconducting quantum interference device (DC-SQUID) inductively coupled to the corresponding qubit. In the context of quantum processor 200, the term "readout subsystem" is used to generally describe the readout devices 251, 252 used to read out the final states of the qubits (e.g., qubits 201 and 202) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.).

Qubit readout may also be performed using alternative circuits, such as that described in U.S. Pat. No. 8,854,074.

While FIG. 2 illustrates only two physical qubits 201, 202, one coupler 210, and two readout devices 251, 252, a quantum processor (e.g., processor 200) may employ any number of qubits, couplers, and/or readout devices, including a larger number (e.g., hundreds, thousands, or more) of qubits, couplers and/or readout devices.

Examples of superconducting qubits include superconducting flux qubits, superconducting charge qubits, and the like. In a superconducting flux qubit, the Josephson energy dominates or is equal to the charging energy. In a charge qubit, it is the reverse. Examples of flux qubits that may be used include radio frequency superconducting quantum interference devices (rf-SQUIDs), which include a superconducting loop interrupted by one Josephson junction, persistent current qubits, which include a superconducting loop interrupted by three Josephson junctions, and the like. See, examples of rf-SQUID qubits in Bocko, et al., 1997, *IEEE Trans. on Appl. Supercond.* 7, 3638; Friedman, et al., 2000, *Nature* 406, 43; and Harris et al., 2010, *Phys. Rev. B* 81, 134510; or persistent current qubits, Mooij et al., 1999, *Science* 285, 1036; and Orlando et al., 1999, *Phys. Rev. B* 60, 15398. In addition, hybrid charge-phase qubits, where the energies are equal, may also be used. Further details of superconducting qubits may be found in Makhlin, et al., 2001, *Rev. Mod. Phys.* 73, 357; Devoret et al., 2004, arXiv:cond-mat/0411174; Zagoskin and Blais, 2007, *Physics in Canada* 63, 215; Clarke and Wilhelm, 2008, *Nature* 453, 1031; Martinis, 2009, *Quantum Inf. Process.* 8, 81; and Devoret and Schoelkopf, 2013, *Science* 339, 1169. In some implementations, the qubits and couplers are controlled by on-chip circuitry. Examples of on-chip control circuitry can be found in U.S. Pat. Nos. 7,876,248; 7,843,209; 8,018,244; 8,098,179; 8,169,231; and 8,786,476. Further details and implementations of exemplary quantum processors that may be used in conjunction with the present systems and devices are described in, for example, U.S. Pat. Nos. 7,533,068; 8,008,942; 8,195,596; 8,190,548; and 8,421,053.

Some quantum processors employ rf-SQUIDs as tunable inter-qubit couplers. In one implementation, the couplers provide a second-order (2-local) interaction between pairs of qubits. However, it is possible to realize higher-order interactions with such devices.

The interaction of qubits and couplers is described by the interaction part of a Hamiltonian for n flux qubits attached to a common coupler via mutual inductances $M_{iC}$ ($1 \leq i \leq n$). This interaction can be written as:

$$\hat{H}_{int} \propto \frac{1}{2} \sum_{i=1}^{n} M_{ic} \hat{I}_i^p \hat{I}_{co}^p \tag{5}$$

where $\hat{I}_i^p$ is the persistent current operator acting on qubit i and $\hat{I}_{CO}^p$ is the persistent current operator acting on the coupler. Assuming small fluxes coupled into the coupler body, the coupler persistent current may be written as an expansion in terms of magnetic susceptibilities $\chi_j$ indexed by j. Magnetic susceptibility is the response of a device's persistent current, $I_P$, to applied external flux, $\Phi^x$. The magnetic susceptibility $\chi_j$ can be expressed as:

$$\chi_j = \frac{1}{j!} \frac{\partial^j I_P}{(\partial \Phi^x)^j}\bigg|_{\Phi^x = \Phi^o_P} \tag{6}$$

where $\Phi^{Op}$ is an operating bias applied to the coupler.

At least one alternative definition of magnetic susceptibility of qubits exists and differs in sign from Equation (6). The coupler persistent current may be expressed as a summation over the product of the magnetic susceptibility and a set of terms accounting for the persistent current in the qubits and the inductive coupling of the qubits to the coupler. For example, $$I_{co}^p = \sum_j \chi_j \left( \sum_{i=1}^n M_{iC} I_i^p \right)^j \quad (7)$$

Interfaces 222, 223 apply a flux signal into a respective qubit loop of qubits 201, 202, thereby realizing a set of diagonal terms in the system Hamiltonian. Further, interfaces 225 couple a flux signal into couplers 210, thereby realizing a set of two qubit (pairwise) interaction terms. The off-diagonal one qubit terms are $\Delta_i$ terms. The diagonal one qubit terms are $h_i$ terms. The two qubit diagonal terms are $J_{ij}$ terms. See U.S. patent application publication US 2015-0032991 A1 for further examples of intended mutual inductance between qubits.

Figure 3:
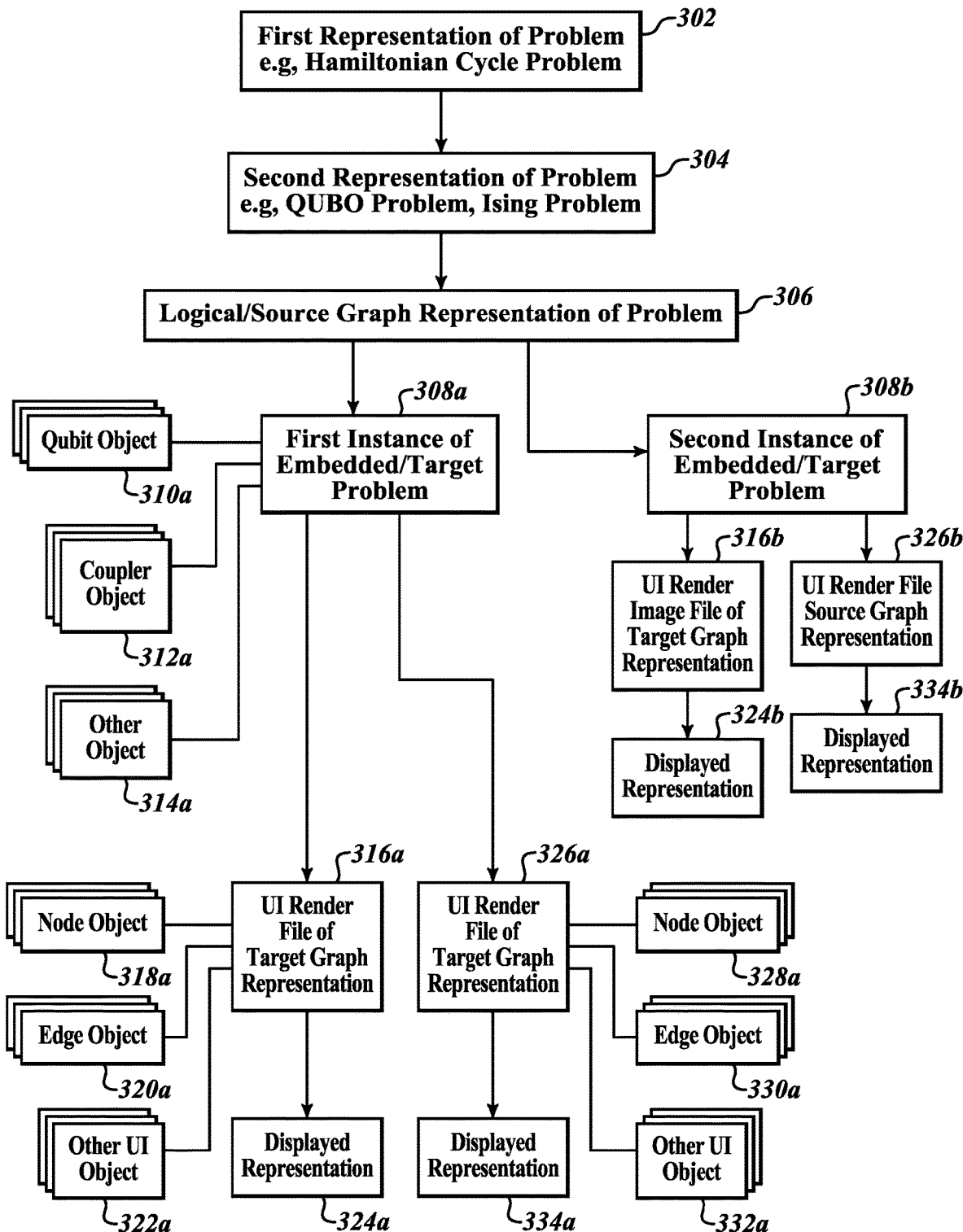
FIG. 3 is a schematic diagram that shows various representations of a problem, typically in the form of files or data structures, to illustrate an exemplary operation of the present systems, devices, methods, and articles.

FIG. 3 shows various representations of a problem, typically in the form of files or data structures, to illustrate an exemplary operation of the present systems, devices, methods, and articles.

A first representation of a problem 302 may be a problem in a conventional mathematical or other form, and may be stored as a file or in a data structure in a nontransitory processor-readable storage media (e.g., memory, spinning disk). For example, the first representation of a problem 302 may be a Hamiltonian cycle problem, a weighted Max-2-SAT problem, a traveling salesmen problem, machine-learning problem, optimization problem or other problem. The first representation of a problem may also be a formulaic representation such as an Ising problem or a quadratic unconstrained binary optimization (QUBO) problem.

A second representation of a problem 304 may be a transformed representation of the first representation of the problem 302, for example in a form that is more suitable for solving via an analog processor (e.g., quantum processor), and may be stored as a file or in a data structure in a nontransitory processor-readable storage media (e.g., memory, spinning disk). For example, the second representation of the problem 304 may represented in the form of a binary quadratic model, for instance an Ising problem, a quadratic unconstrained binary optimization (QUBO) problem, or a matrix. For example, the system may transform a client definition of a problem into a binary quadratic model, then transform the binary quadratic model into quantum machine instructions or rules. In some implementations, the system may also transform one binary quadratic model form into another binary quadratic model form, or reformulate a given binary quadratic model or other mathematical or formulaic representation into a form that may be more suitable for solving via the analog processor.

A logical or source graph representation of a problem 306 may be a transformed representation of the second representation of the problem 304, for example in a form of a graph comprising a plurality of nodes and a plurality of edges, and may be stored as a file or in a data structure in a nontransitory processor-readable storage media (e.g., memory, spinning disk). For example, the logical graph representation of the problem 306 may include, for each pair of nodes, a respective edge that characterizes a connection between the nodes of the pair of nodes coupled by the edge. The logical or source graph representation of the problem 306 may be suitable for determining an embedding of an instance of the problem in a hardware graph (e.g., array of qubits and coupler) of an analog processor (e.g., quantum processor).

A first instance of an embedding or target graph representation of a problem 308a may be a transformed (e.g., a minor embedding) representation of the logical or source graph representation of a problem 306, for example in a form that is embeddable in a hardware graph (e.g., array of qubits and coupler) of an analog processor (e.g., quantum processor), and may be stored as a file or in a data structure in a nontransitory processor-readable storage media (e.g., memory, spinning disk). For example, the embedding or target graph representation of a problem 308a may be represented in the form of a set of qubit objects 310a, coupler objects 312a, and other objects 314a (e.g., interface objects, SQUID objects), the objects 310a, 312a, 314a generated from various object classes (e.g., qubit object class, coupler object class). The embedding graph representation of a problem 308a may comprise the instructions and values of parameters that are used to embed the problem into the hardware graph (e.g., array of qubits and coupler) of an analog processor (e.g., quantum processor), for example bias state values of various qubits, coupling strength values of various couplers, etc. For example, the various qubit objects 310a may include information or data that fully characterizes a respective qubit, for instance a qubit identifier, a qubit bias state, etc. Also for example, the various coupler objects 312a may include information or data that fully characterizes a respective coupler, for instance a coupler identifier, the identity of the qubits which the coupler directly couples, a coupling strength of the coupler, etc. Also for example, the other objects 314a may include information or data that fully characterizes the other hardware element (e.g., programming interfaces, readout interfaces).

A first user interface render file 316a may be a representation of the first instance of the embedding or target graph representation of a problem 308a along with corresponding solution information, and may be stored as a file or in a data structure in a nontransitory processor-readable storage media (e.g., memory, spinning disk). For example, the first user interface render file 316a may, for example, include a set of node objects 318a, edge objects 320a, and other user interface (UI) objects 322a (e.g., console or dashboard, solution representations). Each object 318a, 320a, 322a may include or be associated with a respective user interface element (e.g., icons, user selectable icons, popup dialog boxes, pull-down menus, contextual menus, radio buttons, consoles or dashboards) that is visually presentable and which represent nodes, edges, and other user interface objects. For example, node objects 318a may include or be associated with a visually displayable point or line user interface element, which may be user selectable. The node objects 318a may provide relative locations for each node, so that nodes may be rendered or visually presented in a defined spaced apart representation, which may be display device independent. Also for example, edge objects 320a may include or be associated with a visually displayable line or arc user interface element, which may be user selectable. The edge objects 320a may provide locations (e.g., end points) of each line or arc that match locations of the nodes which the corresponding edge connects, to ensure that the user interface line or arc elements are rendered or visually presented as extending between the nodes of a respective pair of nodes. The other user interface objects 322a may provide locations (e.g., end points, corners, handles) of other user interface object, to ensure that the other user interface objects (e.g., console or dashboard, menus) are rendered or visually presented in respective desired relative positions. The node and edge objects 318a, 320a may be logically associated with respective qubit and coupler objects, such that a hover or selection act with respect to a node or edge causes display of information about the corresponding qubit or coupler.

In some implementations, the first user interface render file 316a may include representations (e.g., icons, user selectable icons) of the hardware elements (e.g., qubits, couplers) of the analog processor (e.g., quantum processor), along with the node and edge representations, the representations of the hardware elements arrayed to visually resemble a layout or arrangement of the hardware elements in the hardware graph of the analog processor (e.g., quantum processor). The nodes and edges may thus be visually spatially mapped to respective hardware elements (e.g., qubits, couplers) of an analog processor (e.g., quantum processor), and thus may represent the first instance of the problem as embedded in the hardware graph (e.g., physical structure) of the analog processor (e.g., quantum processor). An embedding for a given problem may be provided through a variety of embedding techniques and/or algorithms. Thus, an image of the qubits and couplers may be visually presented or displayed, for example on a first display level. An image of the nodes and edges may be displayed, for example on a second level overlaid on the first level, with nodes spatially associated (e.g., aligned, registered, overlying) with respective ones of the images of the qubits and with edges spatially associated (e.g., aligned, registered, overlying) with respective ones of the images of the couplers.

As described elsewhere herein, a given instance of a problem may be subsequently modified to generate a further instance (e.g., modified representation) of the given problem. Thus, a second instance of an embedding or target graph representation of a problem 308b may be a transformed representation of the logical or source graph representation of a problem 306, for example in a form that is embeddable in a hardware graph (e.g., array of qubits and coupler) of an analog processor (e.g., quantum processor), and may be stored as a file or in a data structure in a nontransitory processor-readable storage media (e.g., memory, spinning disk). The second instance of an embedding or target graph representation of a problem 308b may be similar in some respects to the first instance of an embedding or target graph representation of a problem 308a, but will have one or more differences with respect thereto. For example, the second instance of an embedding or target graph representation of a problem 308b may have differences in the values of one or more parameters (e.g., coupling strength, number of times a problem is executed), a different mapping between nodes and qubits, or between edges and couplers, than that of the first instance of an embedding or target graph representation of a problem 308a. Yet both instances of an embedding or target graph representation of a problem 308a, 308b are representations of the initial problem (e.g., first representation of a problem 302, second representation of a problem 304, or logical or source graph representation of a problem 306).

As described elsewhere herein, a given instance of a problem may be subsequently modified to generate a further instance (e.g., modified representation) of the given problem such as second instance 308b. Thus, a second instance or additional instances of a user interface render file 316b may be generated, and may be stored as a file or in a data structure in a nontransitory processor-readable storage media (e.g., memory, spinning disk). The second instance of a user interface render file 316b may be similar in some respects to the first instance of user interface render file 316a, but will have one or more differences with respect thereto. For example, the second instance of user interface render file 316b may have differences in the values of one or more parameters, a different mapping between nodes and qubits, or between edges and couplers than that of the first instance of user interface render file 316a. Yet both instances of user interface render file 316a, 316b are representations of variations on the initial problem (e.g., first representation of a problem 302, second representation of a problem 304, or logical graph representation of a problem 306) and respective solutions to those instances of the initial problem.

The first user interface render file 316a and the second user interface render file 316b may be renderable or visually presentable via a display screen as a displayed representation 324a, 324b, respectively.

A third user interface render file 326a may be a representation of the first instance of a logical problem or source graph representation of a problem 308a along with corresponding solution information, and may be stored as a file or in a data structure in a nontransitory processor-readable storage media (e.g., memory, spinning disk). For example, the third user interface render file 326a may, for example, include a set of node objects 328a, edge objects 330a, and other objects 332a (e.g., console or dashboard, solution representations), similar to those shown for the first user interface render file 316a, and which description will not be repeated in the interest of conciseness.

In contrast to the first user interface render file 316a, the third user interface render file 326a stores a representation of a logical problem or source graph representation, and thus the nodes correspond to logical problem variables rather than physical or logical qubits. The third user interface render file 326a thus omits representation (e.g., icons, user selectable icons) of the hardware elements (e.g., qubits, couplers) of the analog processor (e.g., quantum processor). The logical problem or source graph representation includes the node and edge representations which may, for example, optionally be arranged in a force-directed graph.

As described elsewhere herein, a given instance of a problem may be subsequently modified to generate a further instance (e.g., modified representation) of the given problem, such as the second instance of the embedded or target problem 308b. Thus, a fourth instance or additional instances of a user interface render file 326b may be generated, and may be stored as a file or in a data structure in a nontransitory processor-readable storage media (e.g., memory, spinning disk). The fourth instance of a user interface render file 326b may be similar in some respects to the third instance of user interface render file 326a, but will have one or more differences with respect thereto. For example, the fourth instance of user interface render file 326b may have differences in the values of one or more parameters, a different mapping between nodes and qubits, or between edges and couplers than that of the third instance of user interface render file 326a. Yet both instances of user interface render file 326a, 326b are representations of variations on the initial problem (e.g., first representation of a problem 302, second representation of a problem 304, or logical graph representation of a problem 306) and respective solutions to those instances of the initial problem.

The third user interface render file 326a and the fourth user interface render file 326b may be renderable or visually presentable via a display screen as a displayed representation 334a, 334b, respectively.

The user interface render files 316a, 316b, 326a, 326b may include icons (e.g., circle with diagonal line passing through the circle; lighting bolt), characters (e.g., alphanumeric, X character) or visual characteristics (e.g., color, stippling, cross-hatching, marqueeing or flashing) of icons that represent a status or condition of the problem or of one or more of the hardware elements. For example, one or more icons, characters or visual characteristics may indicate the presence or existence of a broken chain in the embedded problem, or may indicate a chain length in the embedded problem that exceeds a specified maximum chain length. These informational or warning or alert indications may be presented within a graph representation and/or in another area of the user interface for example in a console or dashboard area. As described elsewhere herein, one or more data structures may store relationships between data elements representing the embedding or target graph representation of an instance of a problem and solution and data elements representing the logical problem or source graph representation of the instance of the problem and solution. Such may advantageously allow correspondence between elements (e.g., nodes, edges) of two different types of graph representations (e.g., source graph, target graph) to be visually represented. For instance, selection of a given node in a source graph representation of an instance of a problem and solution may cause a highlighting of a corresponding node in a target graph representation of the instance of the problem and solution.

Figure 4:
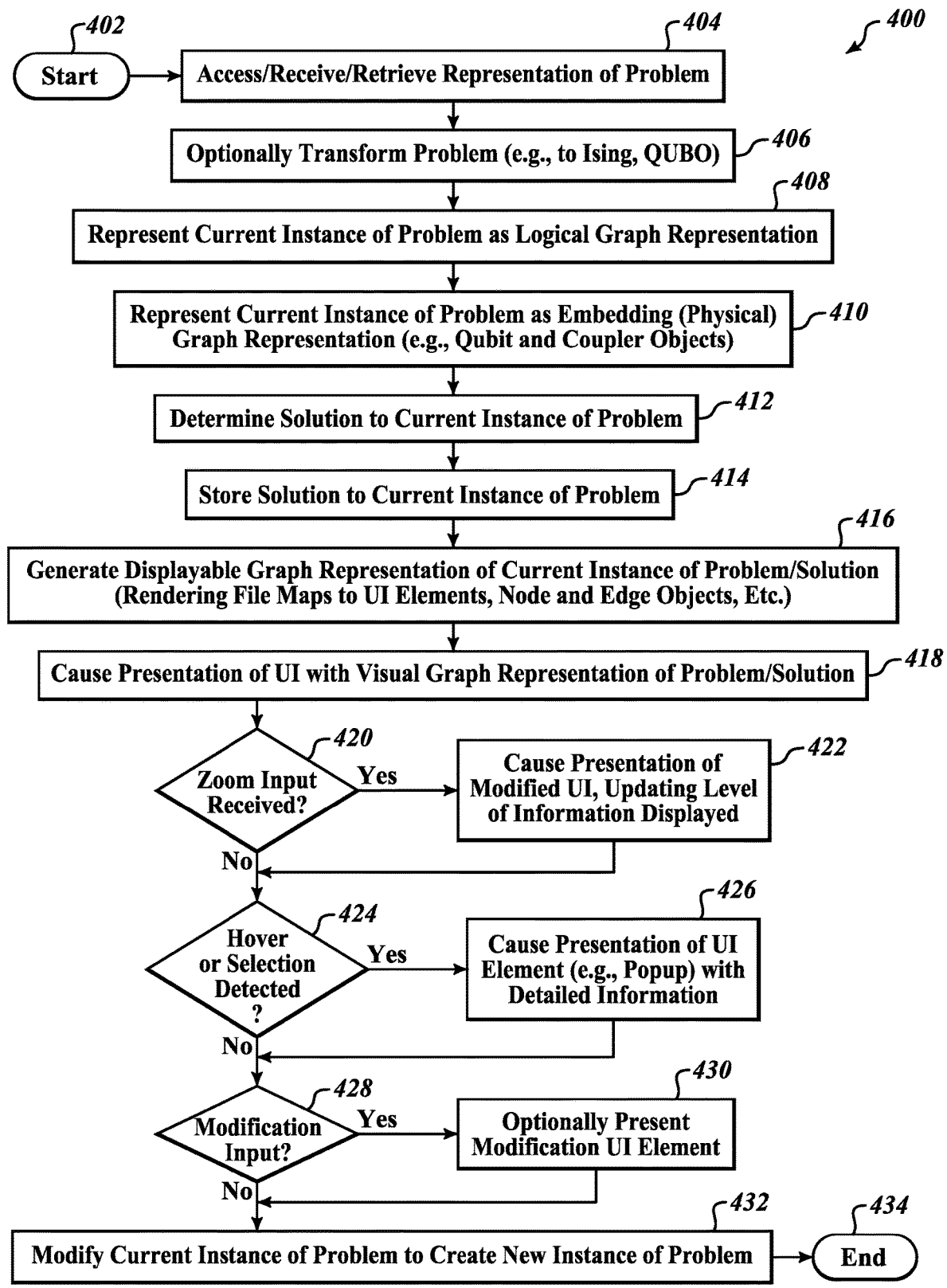
FIG. 4 is a flow diagram of a high level method to provide a user interface to facilitate programming, analyzing, debugging, embedding, and/or modifying problems embedded or to be embedded on a quantum processor, in accordance with the present systems, devices, methods, and articles.

FIG. 4 shows a method 400 of operating a processor-based system to provide a user interface for use with a quantum processor-based system, according to at least one illustrated implementation. The processor-based system may take the form of 102 (FIG. 1) while the quantum processor-based system may take the form of analog computer system 104 (FIG. 1) and/or quantum processor 200 (FIG. 2) that comprises a plurality of qubits and a plurality of couplers, each of the couplers operable to set a coupling strength between a respective pair of the qubits. The method is executable by at least one processor that executes processor-executable instructions stored on nontransitory processor-readable media. The method 400 may be used to provide a user interface that facilitates programming, analyzing, debugging, embedding, and/or modifying problems embedded or to be embedded on a quantum processor.

The method 400 may repeat for multiple instances of a given problem, each instance may be a respective representation of the problem, for example modified from instance to instance in order to improve a solution and/or improve computational efficiency of the analog computer system. For clarity of explanation, the method 400 is described as starting at a point in time or operation, after which a solution to a current instance of the problem has been generated via the analog computer system (e.g., quantum computer system). This allows the user interface to display information about the current instance of the problem as well as the solution that results from that same instance of the problem, thereby facilitating analysis, debugging, modification and/or embedding and execution of a new instance of the problem, for example resulting from a modification of a previous instance of the problem.

The method 400 may start at 402, for example in response to powering of a system, submission of a problem, or a call or other invocation via a calling routine.

At 404, the processor-based system accesses a representation of a current (e.g., selected) instance of a problem as embedded in the hardware graph of the analog processor (e.g., quantum processor). The processor-based system may, for example, access a problem data store which stores a representation of the problem and associated problem data. The problem may be represented as a relatively high-level problem representation, for example a Hamiltonian cycle problem, a traveling salesmen problem or other conventional problem. Alternatively, the problem may be represented as specific formulaic problem representation, for example as an Ising problem or QUBO problem. In another alternative, the problem may be represented as a set of machine instructions formed by pre-processing a problem representation.

Optionally at 406, the processor-based system transforms the problem representation to a form that is more suitable for solution via an analog processor (e.g., quantum processor). For example, the processor-based system may convert a Hamiltonian cycle problem, a traveling salesmen problem, a constraint satisfaction problem, a machine-learning problem (e.g., supervised machine-learning problem) or another decision or optimization problem into an Ising problem formulation, a weighted MAX-2-SAT problem formulation, or a QUBO problem formulation. In other implementations, the processor-based system may transform the problem representation between problem representations, such as transforming an Ising problem formulation to a QUBO problem formulation, or vice-versa.

At 408, the processor-based system generates a logical or source graph representation of the current instance of the problem. The logical or source logical graph representation includes a set of nodes and set of edges that represent the current instance of the problem as a source graph. Each of the edges extend between the nodes of a respective pair of nodes.

At 410, the processor-based system generates an embedding or target graph representation of the instance of the problem. The embedding or target graph representation includes a set of nodes and a set of edges that represent the current instance of the problem in a form that is embeddable in the hardware (e.g., qubits, couplers) of the analog processor (e.g., quantum processor). The nodes may, for example, correspond to respective qubits of a quantum processor. The edges may, for example, correspond to respective couplers of a quantum processor and represent a communicative coupling between respective pairs of the qubits of the quantum processor that are represented by the pair of the nodes between which the respective edge extends.

For example, the processor-based system may generate a first instance of a problem in at least one data structure. For instance, the processor-based system may generate a plurality of qubit objects. Each of the qubit objects may be generated from a qubit class of objects. Each of the qubit objects may have a respective identifier that uniquely identifies the qubit object from other qubit objects for the first instance of the problem, and values for one or more qubit parameters that characterize how a respective qubit of the quantum processor will operate. The processor-based system may generate each of the qubit objects with a respective value that represents a respective programmed bias state of the qubit for an embedding of the first instance of the problem on the quantum processor. Also for instance, the processor-based system may generate a plurality of coupler objects. Each of the coupler objects may be generated from a coupler class of objects. Each of the coupler objects may have a respective identifier that uniquely identifies the coupler object from other coupler objects for the first instance of the problem, and values for one or more coupler parameters that characterize how a respective coupler of the quantum processor will operate. The processor-based system may generate each of the coupler objects with a respective pair of values that represent respective ones of a pair of qubits which the coupler communicatively couples in an embedding of the instance of the problem on the quantum processor, and a respective pair of strength values that represent a strength of the respective communicative couplings.

The processor-based system may, for each of the qubit objects, store a respective logical relationship between the qubit object and a respective one of the nodes. Additionally, the processor-based system may, for each of the coupler objects, store a respective logical relationship between the coupler object and a respective one of the edges.

At 412, the processor-based system determines a solution to the current instance of a problem. Such may, for example, include executing the current instance of the problem on an analog processor (e.g., quantum processor) and/or in a solver (e.g., solver implemented via one or more digital processors). An example of such is described below with reference to FIG. 5.

At 414, the processor-based system stores the determined solution, for example, in a solution data store stored by one or more nontransitory processor-readable media. It will be understood that the solution data may include multiple individual solutions generated by executing the current instance of the problem multiple times, and that the solution representations discussed further below may include multiple solution values.

At 416, the processor-based system generates a displayable graph representation of the current instance of the problem and solution, which may be denominated as a user interface render file or user interface file. As described with reference to FIG. 3, the user interface render file may include various user interface objects that represent the problem, the solution, associated data, warnings, alerts or other information, and optionally a representation of the layout of the hardware graph of the analog processor (e.g., quantum processor). The problem and solution may be represented in graph form, for example as a graph mapped to the hardware graph of the analog processor, a linear representation, or as a force-directed graph. Various pieces of information may be represented within the graph representation, as popup dialog boxes associated with various user interface elements of the graph representation, or in other areas of a display, for instance in a console or dashboard of the user interface.

Each of two or more of the nodes in the displayable graph representation or user interface render file have corresponding problem information and corresponding solution information logically associated therewith and defined to be visually associated therewith when rendered or displayed. The corresponding problem information is based, at least in part, on the instance of the problem that is being analyzed. The corresponding solution information is based, at least in part, on the instance of the solution to the instance of the problem that is being analyzed. Thus, the corresponding solution information represents the solution to the same instance of the problem that is currently being analyzed.

The displayable graph representation or user interface render file of the current instance of the problem and solution advantageously visually associates respective aspects of the solution with aspects of the problem and/or the hardware (e.g., qubits, couplers, programming interfaces, readout interfaces) of the analog processor (e.g., quantum processor). For example, each icon that represents either a node or an associated qubit may include an indication of a programmed bias state of that node or qubit, for example using a set of colors to represent each of the different possible bias states. Also for example, each icon that represents either a node or an associated qubit may include an indication of a read-out solution state of that node or qubit, for example using a set of colors to represent each of the different possible solution states. In some implementations illustrated elsewhere herein, the programmed bias state may be represented by a color or a pattern filling an outer circle, while the solution state may be represented by a color or pattern filling an inner circle of a pair of nested circles which represent the node or qubit. In some implementations illustrated elsewhere herein, an operation condition (e.g., normal, abnormal or anomalous condition) may be represented by an icon or a pattern in an inner circle of a pair of nested circles which represent the node or qubit.

In particular, in at least some implementations the processor-based system generates a first rendering file for the graph representation of the first instance of the problem based on a selected type of graphical representation at 416. The first rendering file maps a plurality of user interface elements including the nodes and the edges to respective positions in a display map.

At 418, the processor-based system causes a presentation of the user interface with the displayable graph representation of the current instance of the problem and solution.

In the visual presentation of the user interface, the graph representation may include two or more of the nodes, each node having corresponding problem information and corresponding solution information logically associated therewith. The corresponding problem information may be based at least in part on a current or selected instance (e.g., first instance, second instance, tertiary instance) of the problem and corresponding solution information based at least in part on a current or selected instance of the solution to the problem. The corresponding problem information and the corresponding solution information are each spatially associated with a respective node in the visual presentation of the graph representation.

For example, the displayed user interface with the displayed graph representation may provide a visual representation of the nodes and the edges, optionally mapped to a representation of the hardware (e.g., array of qubits and/or couplers) of the analog processor (e.g., quantum processor). The displayed user interface with the displayed graph representation may also include the problem information and the corresponding solution information, which may be initially visible upon rendering or display of the user interface, or may be presented in response to selection (e.g., hover, click) of one or more selectably displayable user interface elements (e.g., popup dialog box presented in response to detection of a hovering or display action with respect to a node icon, edge icon, qubit icon, or coupler icon).

The problem information and the corresponding solution information are each spatially associated with a respective node in the visual presentation. For example, the corresponding problem information and the corresponding solution information may be located proximate the nodes or edges to which the information corresponds, or popup dialog boxes that display the corresponding problem information and the corresponding solution information may be displayed spatially adjacent or include a lead line to corresponding nodes or edges.

The corresponding problem information for each of the two or more nodes in the graph may, for example, represent a programmed bias state of the qubit that the respective node represents. The corresponding solution information for each of the two or more nodes in the graph may, for example, represent a solution state of the qubit that the respective node represents.

For example, the processor-based system may cause a visual representation with each of the nodes represented by a geometric icon with a first visual indication that identifies the programmed bias state of the qubit that the respective node represents and with a second visual indication that identifies the solution state of the qubit that the respective node represents. For example, the processor-based system may cause a visual representation with each of the nodes represented by a pair of nested geometric icons, where an outer one of the pair of nested icons provides a first visual indication that identifies one of the programmed bias state or the solution state of the qubit that the respective node represents and an inner one of the pair of nested icons provides a second visual indication that identifies the other one of the programmed bias state or the solution state of the qubit that the respective node represents. Also for example, the processor-based system may cause a visual representation with each of the nodes represented by a pair of nested geometric icons where an outer one of the pair of nested icons provides a first visual indication in the form of at least one of a color or a fill pattern that identifies one of the programmed bias state or the solution state of the qubit that the respective node represents and an inner one of the pair of nested icons provides a second visual indication in the form of at least one of a color or a fill pattern that identifies the other one of the programmed bias state or the solution state of the qubit that the respective node represents. Also for example, the processor-based system may cause a visual representation with each of the nodes represented by a pair of nested geometric icons where an outer one of the pair of nested icons provides a first visual indication in the form of a value (e.g., an integer, a real number) that identifies one of the programmed bias state or the solution state of the qubit that the respective node represents and an inner one of the pair of nested icons provides a second visual indication in the form of a value (e.g., an integer, a real number) that identifies the other one of the programmed bias state or the solution state of the qubit that the respective node represents. As a further example, the processor-based system may cause a visual representation with each of the nodes represented by a pair of concentric circles where an outer one of the pair of concentric circles provides a first visual indication that identifies one of the programmed bias state or the solution state of the qubit that the respective node represents and an inner one of the pair of concentric circles provides a second visual indication that identifies the other one of the programmed bias state or the solution state of the qubit that the respective node represents. The first visual indication may be selected from a first set of visual indications that correspond to programmed bias state values and the second visual indication may be selected from a second set of visual indications that correspond to readout state values.

Also for example, the processor-based system may cause a visual representation of the nodes or edges to appear with a visual anomalous condition indication that indicates an appearance of an anomalous condition.

In some situations, the graph representation is a target graph representation in which a spatial arrangement of the nodes resembles a spatial layout of the qubits on the quantum processor and the target graph representation represents an embedding of the first instance of the problem on the quantum processor. In some implementations, the target graph representation may represent a QUBO or Ising model formulation of a problem and solution. In other situations, the graph representation is a logical problem graph representation (e.g., a force-directed graph representation) in which a spatial arrangement of the nodes does not resemble a spatial layout of the qubits on the quantum processor. In some implementations, the source graph representation may represent a QUBO or Ising model formulation of a problem and solution while the target graph representation may represent an Ising model formulation of a problem and solution.

In some implementations, an embedding may pass through two or more phases, steps or iterations. For example, a first pass may create a lattice embedding on a quantum processor, and a second pass may then embed a problem in or on the lattice embedding. In such implementations, the described user interface can visually concurrently present both a source graph and a target graph that are both problem graphs (e.g., the problem graph and the lattice embedded problem graph). Thus, a source graph representation can constitute an initial graph representation while the target graph representation is a transformation of the source graph representation.

For example, the processor-based system may cause a visual representation of the nodes to appear with a visual anomalous condition indication that identifies an anomalous condition that has been detected. For instance, the processor-based system may cause a visual representation of the nodes corresponding to an embedded chain that exceeds a specified chain length threshold to appear with a visual anomalous condition indication that indicates a chain length specified in the first instance of the problem that exceeds the chain length threshold. Also for instance, the processor-based system may cause a visual representation of nodes corresponding with an embedded chain that is broken in solution to appear with a visual anomalous condition indication that indicates an existence of a broken chain.

Any number of user interface elements may be user selectable. A number of exemplary actions in response to selection of certain user selectable user interface elements are described below.

At 420, the processor-based system determines whether a zoom input has been received. The zoom input may be an indication produced in response to a user selecting a zoom icon, which indicates a desired to see information presented at either a higher or lower level of detail.

At 422, in response to a determination that a zoom input has been received, the processor-based system may further cause an update to the presentation of the user interface which includes either a higher or lower level of detail regarding the problem, the solution, or various other aspects. Thus, the processor-based system may adjust a level of information detail visually presented for at least one of the corresponding problem information or the corresponding solution information for at least one of the nodes. Control passes to 424, either directly from 420 if a zoom input has not been received, or indirectly via 422 if a zoom input was received.

At 424, the processor-based system determines whether a hover or selection is detected. The hover or selection input may be an indication produced in response to a user hovering or selecting a given user selectable user interface element (e.g., icon, menu, box), which indicates a desire to see information related to the item (e.g., qubit, coupler, programming interface, read out interface) represented by the selected user selectable user interface element.

At 426, in response to a determination that a hover or selection input has been received, the processor-based system may further cause an update to the presentation of the user interface which includes, for example, additional information about the item (e.g., qubit, coupler, programming interface, read out interface) represented by the selected user selectable user interface element. For example, in response to a hovering or selection of an icon that represents a node or a qubit, the processor-based system may present a dialog box providing details about the operational characteristics of the corresponding qubit or solution.

For example, the processor-based system may cause a presentation of at least one popup dialog box in a same window in which the graph representation is visually presented. Also for example, the processor-based system may cause a presentation of a popup qubit inspector dialog box in response to detecting a hovering or a selecting of one of the nodes, the popup qubit inspector dialog box including at least one or more of: a node or qubit identifier, a value of a variable, a bias value, and a solution value, each associated with the respective node or qubit. Also for example, the processor-based system may cause a presentation of a popup coupler inspector dialog box in response to detecting a hovering or a selecting of one of the edges, the popup coupler inspector dialog box including at least one or more of: an edge or coupler identifier, a value of a variable, a bias value, a solution value, and a chain length value, each associated with the respective edge or coupler. As another example, the processor-based system may cause a presentation of a popup variable inspector dialog box, the popup variable inspector dialog including at least one of: a variable identifier, a variable bias value, a solution value, and a chain length value, each associated with a respective variable.

As another example, the processor-based system may cause a presentation of a console or dashboard in a window in which the graph representation is visually presented. The console may include at least one of: a warning of an anomalous condition in the first instance of the problem or the first instance of the solution to the problem, a description of the anomalous condition in the first instance of the problem or the first instance of the solution to the problem, one or more input values, and a mapping between each of a number of variables of the first instance of the problem and the qubits of the quantum processor. While the console or dashboard may be presented in response to a user input, the console or dashboard may be presented without any specific user input, as a normal part of the user interface.

As another example, the processor-based system may cause a presentation of a histogram over energies in a window in which the graph representation is visually presented. This may, for example, provide a series of solutions found to the problem. In the case of an optimization problem, lower energies may correspond to better solutions.

Control passes to 428, either directly from 424 if a hovering or selection input has not been received, or indirectly via 426 if a hovering or selection input was received.

At 428, the processor-based system determines whether a modification input is detected. The modification input may be an indication produced in response to a user selecting a given user selectable user interface element (e.g., icon, menu, box, selection and drag of a handle or node or edge), entering a value or text in a field, or selecting a value from a list of values (e.g., pull-down list), which indicates at least a desire to modify at least one aspect of the instance of the problem (e.g., changing a programmed bias state of a qubit, changing a coupling strength of a coupler, changing a composition of a chain of qubits, changing a mapping between nodes and respective qubits and/or between edges and respective couplers) represented by the selected user selectable user interface element, and in some implementations or instances indicates the value of the modification.

The modification input may be entered directly via the existing user interface elements or components. Alternatively, in response to receipt or detection of a modification input, the processor-based system may at 428 cause presentation of a specific user-interface element or component to allow input of various values or specification of characteristics to modify the instance of the problem. For example, at least one of the nodes or the edges may be visually represented by respective user-selectable icons, and in response to a selection of one of the user-selectable icons, the processor based system may present a user-interface element that allows modification of at least one aspect of the first instance of the problem to generate a second instance of the problem. For instance, in response to a selection of one of the user-selectable icons, the processor based system may present a user-interface element (e.g., fillable field, drag down list, slide bar) that allows modification of a bias value of a qubit of the quantum processor that corresponds to the respective node represented by the selected one of the user-selectable icons. Also for instance, in response to a selection of one of the user-selectable icons, the processor based system may present a user-interface element (e.g., fillable field, drag down list, slide bar) that allows modification of a coupling strength of a coupler of the quantum processor that corresponds to the respective edge represented by the selected one of the user-selectable icons.

Thus, the user interface may include the graph representation of the current or selected instance of the problem along with at least one user interface edit component, selection of which allows editing of one or more parameters or characteristics of the embedding of the problem to generate the second instance of the problem. The at least one user interface edit component selection may, for example, allow editing of one or more parameters or characteristics of one or more qubits of quantum processor for the embedding of the problem to generate the second instance of the problem. Additionally or alternatively, the at least one user interface edit component selection may, for example, allow editing of one or more parameters or characteristics of one or more couplers of quantum processor for the embedding of the problem to generate the second instance of the problem. Additionally or alternatively, the at least one user interface edit component (e.g., handle, node, edge) may, for example, allow dragging and moving of a node or edge, or example to logically associate a given node or edge with a selected qubit or coupler. Additionally or alternatively, the at least one user interface edit component may, for example, allow dragging and dropping hints onto one or more components of the graph representation.

At 432, in response to a determination that a modification input has been received, the processor-based system may pass control to either 408 or 410 to perform an iteration on a new instance of the problem, the new instance representing a modification to the previous instance of the problem.

In at least some implementations, generating a next instance of the problem, which may be stored or represented in at least one data structure, based on the least one user input received via the graph representation, occurs automatically and autonomously in response to a user input (e.g., enter or selection of a value, a drag and drop operation). For example, the processor-based system may, in response to an input made via at least one of the nodes or the edges, autonomously change one or more values of at least one parameter of at least one of: one or more qubit objects or one or more coupler objects, for example, changing the value(s)

of qubit objects or coupler objects that correspond to any nodes or edges via which an input was made or were otherwise selected. Also for example, the processor-based system may, in response to an input made via at least one of the nodes or the edges, autonomously generate a replacement for at least one of: one or more qubit objects or one or more coupler objects that correspond to any nodes or edges via which the input was made or were otherwise selected.

In at least some implementations, the processor-based system causes a presentation of a comparison of solution information for two or more instances of the problem. For example, the processor-based system may cause a presentation of a user interface that concurrently displays the solution to a first instance of the problem and the solution to a second instance of the problem. This may, for example, facilitate debugging or analysis of the impact of varying parameters.

If a modification input has not been received, control passes to 434 where the method 400 ends until invoked again.

The method 400 may omit some acts, perform acts in a different order than illustrated, and/or may include additional acts. For example, the user interface provides the ability to select whether or not solutions are visually presented in either the source or target graph representations, for instance via a user selectable setting accessed via a pull-down menu. Also for example, the user interface provides the ability to select whether or not chains of qubits are visually presented or hidden in the target graph representations, for instance via a user selectable setting accessed via a pull-down menu. Also for example, the user interface provides the ability to select whether or not broken chains are visually presented or hidden in either the source or target graph representations, for instance via a user selectable setting accessed via a pull-down menu. Also for example, the user interface presents warnings (e.g., broken chain, chain length exceeds a maximum permitted chain length), and in response to a selection of the warning by a user, visually relates the warning to a corresponding object in the source or target graph representation (e.g., in response to selection of a warning message or icon by the user with a cursor or pointer, visually highlighting or otherwise visually emphasizing a corresponding problem area in the graphical representation of the problem). Also for example, the user interface allows a user to search for a node or qubit by an assigned identifier (e.g., name, number, row and column or position in a hardware lattice). Also for example, the user interface provides access to the solver properties and problem parameters submitted by a user, facilitating debugging and enhancing embedding of problems and thereby enhancing computational efficiency.

Figure 5:
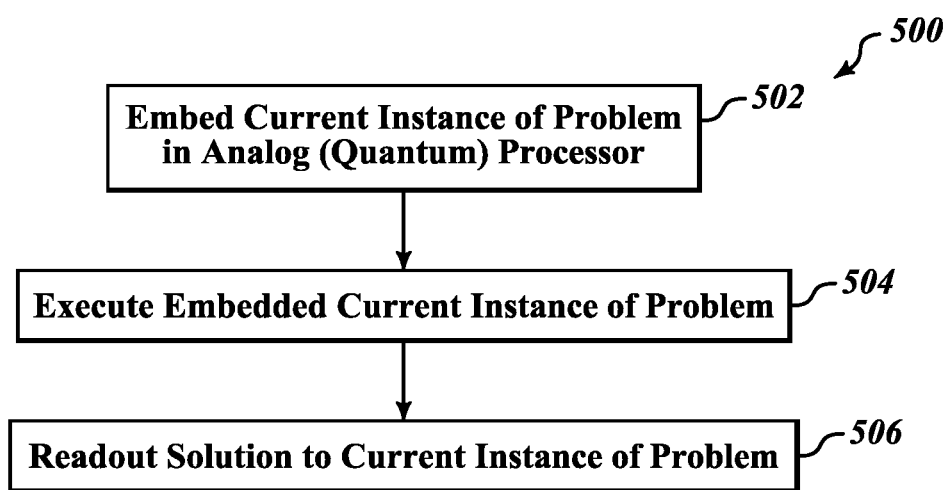
FIG. 5 is a flow diagram of a low level method to determine a solution to a current instance of a problem, which may be performed as part of the method of FIG. 4 to provide a user interface to facilitate programming, analyzing, debugging, embedding, and/or modifying problems embedded or to be embedded on a quantum processor, in accordance with the present systems, devices, methods, and articles.

FIG. 5 shows a method 500 of operating a system, according to at least one illustrated implementation. The system may employ a digital processor-based system similar or identical to digital computer system 102 (FIG. 1) and an analog processor-based system similar or identical to quantum computer system 104 (FIG. 1). The method is executable by at least one processor. The method 500 may be used to provide a user interface that facilitates programming, analyzing, debugging, embedding, and/or modifying problems embedded or to be embedded on a quantum processor. The method 500 may, for example, be performed in executing the determination of a solution to a current instance of a problem 412 (FIG. 4).

The method 500 may optionally repeat multiple times for a given instance of a given problem, where each instance may include a respective representation of the problem, for example modified from instance to instance in order to improve a solution and/or improve computational efficiency of the analog computer system. Repetition for a given instance may likewise improve a solution. The method 400 may start, for example, in response to an invocation from execution of the method 500.

At 502, a processor-based system (e.g., digital computer system 102) embeds a current instance of a problem in an analog processor (e.g., quantum processor 142), for instance via one or more components of an analog computer system 104.

At 504, the analog processor (e.g., quantum processor) executes the embedded current instance of the problem. For example, the analog processor (e.g., quantum processor) performs at least one quantum processing operation with the current instance of the problem embedded therein.

At 506, a readout system 144 of an analog computer system 104 reads out a first instance of a solution to the problem from the quantum processor after performing at least one quantum processing operation with the first instance of the problem embedded therein.

The method 500 may repeat one or more times for current instance of problem (e.g., first instance of the problem). The processor-based system (e.g., digital computer system 102) may perform some post-processing activity on the solution(s) to the problem that are read out from the quantum processor.

The method 500 may subsequently repeat one or more times for a next instance of the problem (e.g., second instance of the problem, tertiary instance of the problem).

FIG. 6 shows an exemplary user interface (UI) in the form of a window 600 presentable on a display screen (e.g., touch-sensitive display screen, computer monitor) including a simplified graph representation 602 of an instance of a problem and solution to the problem presented in a first panel 600a of the UI window 600, a plot of energy level occurrences 604 that represents a solution or a series of potential solutions to the problem presented in a second panel 600b of the window 600, and a console or dashboard 606 presented in a third panel 600c of the window 600, in accordance with the present systems, devices, methods, and articles. The graph representation 602, the plot of energy level 604, and the console or dashboard 606 may advantageously be presented concurrently, allowing a user to easily view and comprehend patterns between the various pieces of information. The user interface window 600 not only displays problem and solution information in a synergistic fashion, but may provide an interactive tool that allows authoring, for example programming qubits and couplers directly, dragging and dropping hints onto a graph to trigger automatic and autonomous embedding, or to otherwise edit or refine a representation of a problem to produce or generate a new instance of the representation of the problem.

The user interface window 600 may include a first graph panel 600a in which the graph representation 602 of an instance of a problem and solution to the problem is displayed (hereinafter graph representation 602). As described herein, the graph representation 602 may take a variety of forms. For example, the graph representation 602 may take the form of a logical problem graph, as illustrated in FIG. 6, in which the nodes of the graph represent respective problem variables. The logical problem graph is also interchangeably referred to herein as a source graph or source view. In some instances, the logical problem graph may optionally take the form of a force-directed graph, for example, a graph where a total number of crossings of edges is minimized. Also for instance, a logical problem view form of the graph representation 602 may take the form of a linear representation.

The graph representation 602 includes a plurality of nodes 610a, 610b, 610c, 610d, 610e, 610f, 610g, 610h (eight shown, collectively 610) and a plurality of edges 612a, 612b, 612c, 612d, 612d (twelve shown, only six called out, collectively 612). Each node 610 may be represented by a respective icon, for example a geometric object such as the illustrated nested pair of circles including an outer circle 614 (only one called out) and an inner circle 616 (only one called out), or a line or other geometric object (e.g., nested hexagons). Each edge 612 may be represented by a respective icon, for example a line or arc.

Each node 610 may advantageously visually represent both problem information and solution information associated with the corresponding logical problem variable which the node represents, the problem information and solution information visually spatially associated with one another (e.g., visually overlaid or overlapping, or at least proximate one another). In the illustrated example, problem information (e.g., programmed bias state) is visually represented as part of an outermost circle 614 of the nested circles while solution information (e.g., read-out state) is visually represented as part of an innermost circle 616 of the nested circles. The problem information and the solution information can, for example, be represented via a color selected from a set of colors, a pattern selected from a set of patterns, a character (e.g., alphanumeric) selected from a set of characters (e.g., −3, −2, −1, 0, +1, +2, +3), or any other visually perceptible effect. Additionally or alternatively, the problem information and the solution information can, for example, be represented by a respective icon, for example a geometric object such as the illustrated nested pair of circles, or a line or other geometric object (e.g., nested hexagons). In FIG. 6, three programmed bias states of the problem are represented by white, black and cross-hatched stippled in the outer circle 614, while two read out states of the solution are represented by white and stippled in the inner circle 616. A larger or smaller set of parameter values can be represented by a larger or smaller number of colors, patterns, shapes, characters and/or icons. A target or quantum processor graph may use the same or similar visual cues for programmed state and solution states as employed in a source graph. Example user interfaces and icons that may be employed in various embodiments described herein are illustrated in U.S. design patent application Ser. No. 29/725,225, filed Feb. 24, 2020, titled GRAPHICAL USER INTERFACE AND ICON FOR A DISPLAY SCREEN OR PORTION THEREOF.

One or more nodes 610 may also advantageously visually represent the existence of an abnormal condition or anomaly (e.g., existence of a broken chain in the embedding, a chain length that exceeds a defined limit on chain length), for example with a status or condition icon 618 (only one called out) that represents the existence of an abnormal condition or anomaly and which may optionally identify the abnormal condition or anomaly. The status or condition icon 618 may, for example, resemble a lightning bolt, zigzag line, or a circle with a diagonal bar extending through the circle.

The user interface window 600 may visually indicate which variables are coupled to one another and are not coupled to one another, for example presenting solid line representations of nodes and edges for those that are coupled (e.g., 610a, 610b, 612a) and presenting broken line representations of nodes and edges for those that are not coupled but are potentially coupleable (e.g., 610h, 612f).

The user interface window 600 may include a variety of dialog boxes, for example popup dialog boxes that are presented in response to some user input, for instance a hovering over a node or edge or a selection (e.g., click with computer mouse) of a node or edge.

For instance, the user interface window 600 may display a popup qubit inspector dialog box 624 in response to detecting a hovering or a selecting of one of the nodes. The popup qubit inspector dialog box 624 may include node or qubit information 626 about the node or the qubit which is used to represent the variable that the node represents, including for example one or more of: a node or qubit identifier, a value of a variable, a bias value or a solution value, each associated with the respective node or qubit.

Also for instance, the user interface window 600 may display a popup coupler inspector dialog box 628 in response to detecting a hovering over a selected of one of the edges. The popup coupler dialog box 628 may include edge or coupler information 630 about the edge or coupler which the edge represents, including for example one or more of: an edge or coupler identifier, a value of a variable, a bias value, a solution value, or a chain length value, each associated with the respective edge or coupler.

Also for instance, the user interface window 600 may display a popup variable inspector dialog box 632. The popup variable inspector dialog box 632 includes variable related information 634 about various variables or parameters, including for example one or more of: a variable identifier, a variable bias value, a solution value, and a chain length value, each associated with a respective variable.

The user interface window 600 may include one or more handles 636a, 636b (only two shown) that allow the various user interface elements to be dragged and dropped or moved to other locations in a graph representation. For example, each node 610 may have a respective handle 636a or may itself be a handle and/or each edge 612 may have a respective handle 636b or may itself be a handle. Selecting the handle 636a, 636b with a cursor 638 controlled by a pointing device (e.g., computer mouse, trackball, finger) allows the handle 636a, 636b, and hence the corresponding user interface element, to be moved to a new location. For instance, a node 610 can be moved from one qubit representation to another qubit representation, indicating an instruction to modify the graph representation 602 by associating the node 610 of the logical graph representation of the problem with a different qubit in the embedding of the problem. Handles 636a, 636b may be context sensitive and/or may not be displayed until the cursor 638 is positioned at or proximate the location of the handle 636a, 636b.

The user interface window 600 may include one or more drop zones 640 (only one shown) that may allow the various user interface elements to be dragged and dropped at various areas of the graph representation 602. For example, each node 610 may have a respective drop zone 640 and/or each edge 612 may have a respective drop zone 640 and/or other areas of the user interface 600 may have a drop zone 640.

A user may perform authoring or editing via the user interface window 600. In at least some implementations, the digital computer system may automatically and/or autonomously generate or update a logical graph representation based at least in part on the user input. Additionally or alternatively, the digital computer system may automatically and/or autonomously generate a logical graph representation based at least in part on the quantum processor connectivity.

The console or dashboard 606 may be presented in a console or dashboard panel 600c of the user interface window 600. The console or dashboard 606 may provide various forms of information. For example, the console or dashboard 606 may provide warnings or alerts 644, for example warnings or alerts about the existence of an actual or potential abnormal condition or anomaly (e.g., existence of a broken chain in the embedding, a chain length that exceeds a defined limit on chain length). The warnings or alerts 644 may not only indicate the existence of the abnormal condition or anomaly, but may also specify a type of abnormal condition or anomaly, a description of the abnormal condition or anomaly, identity of one or more components (e.g., qubits, couplers) that are the subject of the abnormal condition or anomaly, and/or a level of severity of the abnormal condition or anomaly. The console or dashboard 606 may include information such as the identities 646 of one or more sources (e.g., nodes in logical graph) and/or the identities 648 of one or more targets (e.g., qubits in physical or embedding graph). The presentation of the identities may advantageously tie target variables to physical qubits.

The user interface window 600 may include a second graph panel 600b in which, for example, the plot or histogram over energies 604 is presented. The plot or histogram over energies 604 represents solutions to the instance of the problem and may optionally be user selectable and modifiable. The system may automatically update the graph representation 602 and the underlying data structures (e.g., node objects, edge objects) in response to the user selection and/or modification. The digital computer system may automatically select the lowest energy solution. The presentation may be a two-dimensional presentation, and states with the same energy may be stacked. This can advantageously reduce the total number of values along a given axis (e.g., X axis) as compared with using states along the given axis. The digital computer system may optionally perform binning to group similar or equivalent solutions together. In some implementations the digital computer system may also place a lowest energy solution in its own bin. The digital computer system may dynamically size the bins, for example, by allocating relatively low energy solutions to a large number of narrowly defined bins and relatively high energy solutions to a smaller number of bins that are more broadly defined.

The second graph panel 600b may present other information, for example other plots or graphs. In some implementations, a first graph panel 600a may present a source graph (e.g., nodes represent respective variables in a logical problem formulation of a problem and solution) while the second graph panel 600b concurrently presents a target graph (e.g., nodes represent respective qubits in an embedding formulation of a problem and solution). Also for instance, solution graphs may be presented in other formats, for example barrier-tree analysis graphs or Hamming graphs. It will be understood that while only two additional types of graph representations are listed, there are a wide variety of types of graph representations that may be used.

The digital computer system may automatically and/or autonomously compare results of different instances or versions of representations of a given problem, thereby facilitating analysis or debugging of the representation and, in particular, the embedding of the problem in the hardware graph of a particular quantum processor.

While not illustrated, the user interface window 600 may include various menus, sub-menus and other user interface elements, which may be useful for importing problems, exporting problem representations and solutions, as well as performing other actions.

FIG. 7A shows an exemplary user interface window 700a including a quantum processor or target graph representation of an instance of a problem and solution to the problem 702a presented in a first panel of a window, a plot of energy level 704a occurrences which represent solutions to the instance of the problem presented in a second panel of the window, and a console or dashboard 706a presented in a third panel of the window, in accordance with the present systems, devices, methods, and articles.

Many of the user interface elements of the user interface window 700a are similar or even identical to those illustrated in and discussed with reference to FIG. 6, so are not called out or discussed separately in the interest of conciseness.

The graph representation 702a, the plot of energy level 704a, and the console or dashboard 706a may advantageously be presented concurrently, allowing a user to easily comprehend patterns between the various pieces of information.

For example, the graph representation 702a may take the form of a quantum processor view (denominated as QPU (Quantum Processing Unit) view) or graph in which the nodes (e.g., represented by respective points or lines) visually represent respective physical or logical qubits of a quantum processor in which the problem is or is to be embedded, and the edges (e.g., represented by connections between points or lines) represent the available coupling devices within the quantum processor. The QPU view is also interchangeably referred to herein as a target view or target graph. In the QPU view, the nodes may be visually represented as spatially arrayed to match the spatial arrangement of corresponding qubits of a hardware graph of a quantum processor. The QPU view may visually represent all physical qubits of the quantum processor, for instance as a background grid 711 (which may have a lower line weight or transparency level than the graph), or only those physical or logical qubits to which parameters of the problem have been mapped or embedded. In some implementations, graph representation 702a may be toggled between representation of an Ising formulation of a problem and a QUBO formulation of a problem, with changes to the corresponding biases. In other implementations, graph representation 702a may be toggled between showing a problem solution and the problem definition in combination to showing just the problem definition, for example, to facilitate review of the embedding on the hardware graph. It will be understood that similar toggle features may be applied to the other graphs described herein, as appropriate.

FIG. 7B shows an exemplary user interface window 700b including a logical problem or source graph representation of an instance of a problem and solution to the problem 702b presented in a first panel of a window, a QPU view or target graph representation of the instance of the problem and solution to the problem 702c presented in a second panel of a window, and a console or dashboard 706b presented in a third panel of the window, in accordance with the present systems, devices, methods, and articles. As shown in FIG. 7B, in some implementations the same problem may be displayed in either an Ising formulation or a QUBO formulation.

Many of the user interface elements of the user interface window 700b are similar or even identical to those illustrated in and discussed with reference to FIGS. 6 and 7A, so are not called out or discussed separately in the interest of conciseness.

The graph representations 702a, 702b, 702c, 704a, and the console or dashboard 706a and 706b may advantageously be presented concurrently, allowing a user to easily comprehend patterns between the various pieces of information. Notably, the visual side-by-side presentation of the two graph representations 702a, 702b, 702c, 704a of the problem and solution may further facilitate debugging. For example, such may facilicate comparison of problem variables to qubits. Such may also allow the chain lengths and interconnections to be evaluated and easily changed by user input via the user interface 700b.

FIG. 7C shows an exemplary user interface window 700c including a logical problem or source graph representation 702d of an instance of a problem and solution to the problem presented in a first panel of a window, and a quantum processor or target graph representation 702e of the instance of the problem and solution to the problem presented in a second panel of the window, and a console or dashboard 706c presented in a third panel of the window in accordance with the present systems, devices, methods, and articles.

Many of the user interface elements of the user interface window 700c are similar or even identical to those illustrated in and discussed with reference to FIGS. 6, 7A and 7B, so are not called out or discussed separately in the interest of conciseness.

The graph representations 702d, 702e, and the console or dashboard 706c may advantageously be presented concurrently, allowing a user to easily comprehend patterns between the various pieces of information. Notably, the visual side-by-side presentation of the two graph representations 702d, 702e of the problem and solution may further facilitate debugging. For example, such may facilitate comparison of problem variables to qubits. Such may also allow the chain lengths and interconnections to be evaluated and easily changed by user input via the user interface window 700c.

Most notably, in response to detection of hovering or selection of a node or edge in a first graph representation (e.g., logical problem or source graph representation 702d) in one panel (e.g., first panel), a processor-based system causes the selected node or edge to be visually emphasized (e.g., highlighted, color changed) in the first graph representation (e.g., logical problem or source graph representation 702d) in the one panel (e.g., first panel), as well as causing a corresponding node or edge to be visually emphasized (e.g., highlighted, color changed) in the second graph representation (e.g., QPU view or target graph representation 702e) in the other panel (e.g., second panel). The corresponding node or edge is the node or edge in the second graph that represents a qubit or coupler that is assigned to represent the variable that is represented by the selected node or edge, which the processor-based system can determine via search or query of a data structure.

The processor-based system may also provide a popup dialog box 708a with information that represents an operational condition of the selected node or edge.

FIG. 7D shows an exemplary user interface window 700d including a logical problem or source graph representation 702f of an instance of a problem and solution to the problem presented in a first panel of a window, and a quantum processor or target graph representation 702g of the instance of the problem and solution to the problem presented in a second panel of the window, and a console or dashboard 706d presented in a third panel of the window in accordance with the present systems, devices, methods, and articles.

Many of the user interface elements of the user interface window 700d are similar or even identical to those illustrated in and discussed with reference to FIGS. 6, 7A, 7B and 7C, so are not called out or discussed separately in the interest of conciseness.

The graph representations 702f, 702g, and the console or dashboard 706d may advantageously be presented concurrently, allowing a user to easily comprehend patterns between the various pieces of information. Notably, the visual side-by-side presentation of the two graph representations 702f, 702g of the problem and solution may further facilitate debugging. For example, such may facilitate comparison of problem variables to qubits. Such may also allow the chain lengths and interconnections to be evaluated and easily changed by user input via the user interface window 700d.

Most notably, in response to detection of hovering or selection of a node or edge in a first graph representation (e.g., QPU view or target graph representation 702g) in one panel (e.g., second panel), a processor-based system causes the selected node or edge to be visually emphasized (e.g., highlighted, color changed) in the first graph representation (e.g., QPU view or target graph representation 702g) in the one panel (e.g., second panel), as well as causing a corresponding node or edge to be visually emphasized (e.g., highlighted, color changed) in the second graph representation (e.g., logical problem or source graph representation 702f) in the other panel (e.g., first panel). The corresponding node or edge is the node or edge in the second graph that represents the variable that is assigned to the qubit or coupler that is represented by the selected node or edge in the first graph, which the processor-based system can determine via search or query of a data structure.

The processor-based system may also provide a popup dialog box 708b with information that represents an operational condition of the selected node or edge.

EXAMPLES

Example 1. A method of providing a user interface for use with a quantum processor-based system that comprises a quantum processor including a plurality of qubits and a plurality of couplers, each of the couplers operable to set a coupling strength between a respective pair of the qubits, the method executable by at least one processor that executes processor-executable instructions, the method comprising:

for a problem,
   accessing a representation of a first instance of the problem;
   accessing a representation of a first instance of a solution to the problem;
   generating a graph representation with a set of nodes and edges, each of the edges extending between a respective pairs of the nodes, each of two or more of the nodes in the graph representation having corresponding problem information and corresponding solution information logically associated therewith, the corresponding problem information based at least in part on the first instance of the problem and corresponding solution information based at least in part on the first instance of the solution to the problem; and
   causing a visual presentation of the graph representation including a visual representation of the nodes and the edges and the corresponding problem information and the corresponding associated solution information, the corresponding problem information and the corresponding solution information each spatially associated with the respective node in the visual presentation of the graph representation.

Example 2. The method of Example 1 wherein the corresponding problem information for each of the two or more nodes in the graph represents a programmed bias state of a corresponding variable or a corresponding one of the qubits that the respective node represents.

Example 3. The method of Example 1 wherein the corresponding solution information for each of the two or more nodes in the graph represents a solution state of a corresponding variable or a corresponding one of the qubits that the respective node represents.

Example 4. The method of Example 1 wherein, for each of the two or more nodes in the graph, the corresponding problem information represents a programmed bias state of a corresponding variable or a corresponding one of the qubits that the respective node represents and the corresponding solution information represents a solution state of a corresponding variable or a corresponding one of the qubits that the respective node represents.

Example 5. The method of Example 4 wherein causing a visual presentation of the graph representation includes causing a visual representation of the nodes with a visual indication that identifies the programmed bias state of a corresponding variable or a corresponding one of the qubits that the respective node represents and a visual indication that identifies the solution state of the corresponding variable or the corresponding one of the qubits that the respective node represents.

Example 6. The method of Example 4 wherein causing a visual presentation of the graph representation includes causing a visual representation with each of the nodes represented by a geometric icon with a first visual indication that identifies the programmed bias state of the corresponding variable or the corresponding one of the qubits that the respective node represents and a second visual indication that identifies the solution state of the corresponding variable or the corresponding one of the qubits that the respective node represents.

Example 7. The method of Example 4 wherein causing a visual presentation of the graph representation includes causing a visual representation with each of the nodes represented by a pair of nested geometric icons where an outer one of the pair of nested icons provides a first visual indication that identifies one of the programmed bias state or the solution state of the corresponding variable or the corresponding one of the qubits that the respective node represents and an inner one of the pair of nested icons provides a second visual indication that identifies the other one of the programmed bias state or the solution state of the corresponding variable or the corresponding one of the qubits that the respective node represents.

Example 8. The method of Example 4 wherein causing a visual presentation of the graph representation includes causing a visual representation with each of the nodes represented by a pair of nested geometric icons where an outer one of the pair of nested icons provides a first visual indication in the form of at least one of a color or a fill pattern that identifies one of the programmed bias state or the solution state of the corresponding variable or the corresponding one of the qubits that the respective node represents and an inner one of the pair of nested icons provides a second visual indication in the form of at least one of a color or a fill pattern that identifies the other one of the programmed bias state or the solution state of the corresponding variable or the corresponding one of the qubits that the respective node represents.

Example 9. The method of Example 4 wherein causing a visual presentation of the graph representation includes causing a visual representation with each of the nodes represented by a pair of nested geometric icons where an outer one of the pair of nested icons provides a first visual indication in the form of a value that identifies one of the programmed bias state or the solution state of the corresponding variable or the corresponding one of the qubits that the respective node represents and an inner one of the pair of nested icons provides a second visual indication in the form of a value that identifies the other one of the programmed bias state or the solution state of the corresponding variable or the corresponding one of the qubits that the respective node represents.

Example 10. The method of Example 4 wherein causing a visual presentation of the graph representation includes causing a visual representation with each of the nodes represented by a pair of concentric circles where an outer one of the pair of concentric circles provides a first visual indication that identifies one of the programmed bias state or the solution state of the corresponding variable or the corresponding one of the qubits that the respective node represents and an inner one of the pair of concentric circles provides a second visual indication that identifies the other one of the programmed bias state or the solution state of the corresponding variable or the corresponding one of the qubits that the respective node represents, the first visual indication selected from a first set of visual indications that correspond to programmed bias state values and the second visual indication selected from a second set of visual indications that correspond to readout state values.

Example 11. The method of any of Examples 4 through 10 wherein causing a visual presentation of the graph representation includes causing a visual representation of the nodes with a visual anomalous condition indication that indicates an appearance of an anomalous condition.

Example 12. The method of any of Examples 4 through 10 wherein causing a visual presentation of the graph representation includes causing a visual representation of the nodes with a visual anomalous condition indication that identifies an anomalous condition that has been detected.

Example 13. The method of any of Examples 4 through 10 wherein causing a visual presentation of the graph representation includes causing a visual representation of the nodes with a visual anomalous condition indication that indicates a chain length specified in the first instance of the problem that exceeds a chain length threshold.

Example 14. The method of any of Examples 4 through 10 wherein causing a visual presentation of the graph representation includes causing a visual representation of the nodes with a visual anomalous condition indication that indicates an existence of a broken chain.

Example 15. The method of Examples 1 through 10, further comprising:
  presenting a zoom level adjustment user interface element; and
  based at least in part on user input received via the zoom level adjustment user interface element, adjusting a level of information detail visually presented for at least one of the corresponding problem information or the corresponding solution information for at least one of the nodes.

Example 16. The method of any of Examples 1 through 10 wherein the graph representation is a target graph representation in which each node represents a respective physical or logical qubit in the quantum processor, and each edge represents a communicative coupling between respective pairs of the qubits of the quantum processor that are represented by the pair of the nodes between which the respective edge extends, and a spatial arrangement of the nodes resembles a spatial layout of the qubits on the quantum processor and the target graph representation represents an embedding of the first instance of the problem on the quantum processor, and causing a visual presentation of the graph representation includes causing a visual presentation of the target graph representation.

Example 17. The method of any of Examples 1 through 10 wherein the graph representation is a source graph representation in which each node represents a respective variable and a spatial arrangement of the nodes does not resembles a spatial layout of the qubits on the quantum processor and causing a visual presentation of the graph representation includes causing a visual presentation of the force-directed graph representation.

Example 18. The method of any of Examples 1 through 10 wherein at least one of the nodes or the edges is visually represented by respective user-selectable icons, and in response to a selection of one of the user-selectable icons, presenting a user-interface element that allows modification of at least one aspect of the first instance of the problem to generate a second instance of the problem.

Example 19. The method of any of Examples 1 through 10 wherein the nodes are visually represented by respective user-selectable icons, and in response to a selection of one of the user-selectable icons, presenting a user-interface element that allows modification of a bias value of a qubit of the quantum processor that corresponds to the respective node represented by the selected one of the user-selectable icons.

Example 20. The method of any of Examples 1 through 10 wherein the edges are visually represented by respective user-selectable icons, and in response to a selection of one of the user-selectable icons, presenting a user-interface element that allows modification of a coupling strength of a coupler of the quantum processor that corresponds to the respective edge represented by the selected one of the user-selectable icons.

Example 21. The method of Example 1, further comprising:
in response to a user input, presenting at least one popup dialog box in a window in which the graph representation is visually presented.

Example 22. The method of any of Examples 1 through 10 wherein presenting at least one popup dialog box includes presenting a popup qubit inspector dialog box in response to detecting a hovering or a selecting of one of the nodes, the popup qubit inspector dialog box including at least one or more of: a node or qubit identifier, a value of a variable, a bias value or a solution value, each associated with the respective node or qubit.

Example 23. The method of any of Examples 1 through 10 wherein presenting at least one popup dialog box includes presenting a popup coupler inspector dialog box in response to detecting a hovering or a selecting of one of the edges, the popup coupler dialog box including at least one or more of: an edge or coupler identifier, a value of a variable, a bias value, a solution value, or a chain length value, each associated with the respective edge or coupler.

Example 24. The method of any of Examples 1 through 10 wherein presenting at least one popup dialog box includes presenting a popup variable inspector dialog box, the popup variable inspector dialog including at least one of: a variable identifier, a variable bias value, a solution value, a chain length value, each associated with a respective variable.

Example 25. The method of any of Examples 1 through 10, further comprising:
presenting a console in a window in which the graph representation is visually presented, the console including at least one of: a warning of an anomalous condition in the first instance of the problem or the first instance of the solution to the problem, a description of the anomalous condition in the first instance of the problem or the first instance of the solution to the problem, one or more input values, or a mapping between each of a number of variables of the first instance of the problem and the qubits of the quantum processor.

Example 26. The method of any of Examples 1 through 10, further comprising:
causing a visual presentation of a histogram over energies in a window in which the graph representation is visually presented.

Example 27. The method of any of Examples 1 through 10 wherein causing a visual presentation of the graph representation includes causing the visual presentation of the graph with the qubits of the quantum processor represented as either points or lines.

Example 28. The method of any of Examples 1 through 10 wherein causing a visual presentation of the graph representation includes causing the visual presentation of the graph with the first instance of the problem represented as one of: a force-directed graph or a linear representation of the first instance of the problem.

Example 29. The method of Examples 1 or 10, further comprising:
for the problem,
accessing a representation of a second instance of the problem, the second instance representing at least one difference from the first instance of the problem;
accessing a representation of a second instance of a solution to the problem;
generating a graph representation with a set of nodes and edges, each of the edges extending between a respective pairs of the nodes, each of two or more of the nodes in the graph representation having corresponding problem information and corresponding solution information logically associated therewith, the corresponding problem information based at least in part on the second instance of the problem and corresponding solution information based at least in part on the second instance of the solution to the problem; and
causing a visual presentation of the graph representation including a visual representation of the nodes and the edges and the corresponding problem information and the corresponding associated solution information, the corresponding problem information and the corresponding solution information each spatially associated with the respective node in the visual presentation of the graph representation.

Example 30. The method of Examples 1 through 10 wherein accessing a representation of a first instance of a solution to the problem includes accessing information readout from the quantum processor that performed at least one quantum processing operation with the first instance of the problem embedded therein.

Example 31. A system to provide a user interface for use with a quantum processor-based system that comprises a quantum processor including a plurality of qubits and a plurality of couplers, each of the couplers operable to set a coupling strength between a respective pair of the qubits, the system comprising:
at least one processor;
at least one nontransitory processor-readable medium that stores processor-executable instructions, which when executed by at least one processor, cause the at least one processor to:
for a problem, access a representation of a first instance of the problem;

access a representation of a first instance of a solution to the problem;

generate a graph representation with a set of nodes and edges, each of the edges extending between a respective pairs of the nodes, each of two or more of the nodes in the graph representation having corresponding problem information and corresponding solution information logically associated therewith, the corresponding problem information based at least in part on the first instance of the problem and corresponding solution information based at least in part on the first instance of the solution to the problem; and cause a visual presentation of the graph representation including a visual representation of the nodes and the edges and the corresponding problem information and the corresponding associated solution information, the corresponding problem information and the corresponding solution information each spatially associated with the respective node in the visual presentation of the graph representation.

Example 32. The system of Example 31 wherein the corresponding problem information for each of the two or more nodes in the graph represents a programmed bias state of a corresponding variable or a corresponding one of the qubits that the respective node represents.

Example 33. The system of Example 31 wherein the corresponding solution information for each of the two or more nodes in the graph represents a solution state of a corresponding variable or a corresponding one of the qubits that the respective node represents.

Example 34. The system of Example 31 wherein, for each of the two or more nodes in the graph, the corresponding problem information represents a programmed bias state of a corresponding variable or a corresponding one of the qubits that the respective node represents and the corresponding solution information represents a solution state of the corresponding variable or the corresponding one of the qubits that the respective node represents.

Example 35. The system of Example 34 wherein the visual presentation of the graph representation includes a visual representation of the nodes with a visual indication that identifies the programmed bias state of a corresponding variable or a corresponding one of the qubits that the respective node represents and a visual indication that identifies the solution state of the corresponding variable or the corresponding one of the qubits that the respective node represents.

Example 36. The system of Example 34 wherein the visual presentation of the graph representation includes a visual representation with each of the nodes represented by a geometric icon with a first visual indication that identifies the programmed bias state of a corresponding variable or a corresponding one of the qubits that the respective node represents and a second visual indication that identifies the solution state of the corresponding variable or the corresponding one of the qubits that the respective node represents.

Example 37. The system of Example 34 wherein the visual presentation of the graph representation includes a visual representation with each of the nodes represented by a pair of nested geometric icons where an outer one of the pair of nested icons provides a first visual indication that identifies one of the programmed bias state or the solution state of a corresponding variable or a corresponding one of the qubits that the respective node represents and an inner one of the pair of nested icons provides a second visual indication that identifies the other one of the programmed bias state or the solution state of the corresponding variable or the corresponding one of the qubits that the respective node represents.

Example 38. The system of Example 34 wherein the visual presentation of the graph representation includes a visual representation with each of the nodes represented by a pair of nested geometric icons where an outer one of the pair of nested icons provides a first visual indication in the form of at least one of a color or a fill pattern that identifies one of the programmed bias state or the solution state of a corresponding variable or a corresponding one of the qubits that the respective node represents and an inner one of the pair of nested icons provides a second visual indication in the form of at least one of a color or a fill pattern that identifies the other one of the programmed bias state or the solution state of the corresponding variable or the corresponding one of the qubits that the respective node represents.

Example 39. The system of Example 34 wherein the visual presentation of the graph representation includes a visual representation with each of the nodes represented by a pair of nested geometric icons where an outer one of the pair of nested icons provides a first visual indication in the form of a value that identifies one of the programmed bias state or the solution state of a corresponding variable or a corresponding one of the qubits that the respective node represents and an inner one of the pair of nested icons provides a second visual indication in the form of a value that identifies the other one of the programmed bias state or the solution state of the corresponding variable or the corresponding one of the qubits that the respective node represents.

Example 40. The system of Example 34 wherein the visual presentation of the graph representation includes a visual representation with each of the nodes represented by a pair of concentric circles where an outer one of the pair of concentric circles provides a first visual indication that identifies one of the programmed bias state or the solution state of a corresponding variable or a corresponding one of the qubits that the respective node represents and an inner one of the pair of concentric circles provides a second visual indication that identifies the other one of the programmed bias state or the solution state of the corresponding variable or the corresponding one of the qubits that the respective node represents, the first visual indication selected from a first set of visual indications that correspond to programmed bias state values and the second visual indication selected from a second set of visual indications that correspond to readout state values.

Example 41. The system of any of Examples 34 through 40 wherein the visual presentation of the graph representation includes a visual representation of the nodes with a visual anomalous condition indication that indicates an occurrence of an anomalous condition.

Example 42. The system of any of Examples 34 through 40 wherein the visual presentation of the graph representation includes a visual representation of the nodes with a visual anomalous condition indication that identifies an anomalous condition that has been detected.

Example 43. The system of any of Examples 34 through 40 wherein the visual presentation of the graph representation includes a visual representation of the nodes with a visual anomalous condition indication that indicates a chain length specified in the first instance of the problem that exceeds a chain length threshold.

Example 44. The system of any of Examples 34 through 40 wherein the visual presentation of the graph representation includes a visual representation of the nodes with a visual anomalous condition indication that indicates an existence of a broken chain.

Example 45. The system of Examples 31 through 40 wherein, when executed by the at least one processor, the instructions cause the at least one processor further to:
 presents a zoom level adjustment user interface element; and
 based at least in part on user input received via the zoom level adjustment user interface element, adjust a level of information detail visually presented for at least one of the corresponding problem information or the corresponding solution information for at least one of the nodes.

Example 46. The system of any of Examples 31 through 40 wherein the graph representation is a target graph representation in which each node represents a respective physical or logical qubit in the quantum processor, and each edge represents a communicative coupling between respective pairs of the qubits of the quantum processor that are represented by the pair of the nodes between which the respective edge extends, and a spatial arrangement of the nodes resembles a spatial layout of the qubits on the quantum processor and the target graph representation represents an embedding of the first instance of the problem on the quantum processor, and the visual presentation of the graph representation includes a visual presentation of the target graph representation.

Example 47. The system of any of Examples 31 through 40 wherein the graph representation is a source graph representation in which each node represents a respective variable and a spatial arrangement of the nodes does not resembles a spatial layout of the qubits on the quantum processor and the visual presentation of the graph representation includes causing a visual presentation of the force-directed graph representation.

Example 48. The system of any of Examples 31 through 40 wherein at least one of the nodes or the edges is visually represented by respective user-selectable icons, and wherein, when executed by the at least one processor, the instructions cause the at least one processor further to:
 in response to a selection of one of the user-selectable icons, present a user-interface element that allows modification of at least one aspect of the first instance of the problem to generate a second instance of the problem.

Example 49. The system of any of Examples 31 through 40 wherein the nodes are visually represented by respective user-selectable icons, and wherein, when executed by the at least one processor, the instructions cause the at least one processor further to:
 in response to a selection of one of the user-selectable icons, present a user-interface element that allows modification of a bias value of a qubit of the quantum processor that corresponds to the respective node represented by the selected one of the user-selectable icons.

Example 50. The system of any of Examples 31 through 40 wherein the edges are visually represented by respective user-selectable icons, and wherein, when executed by the at least one processor, the instructions cause the at least one processor further to:
 in response to a selection of one of the user-selectable icons, present a user-interface element that allows modification of a coupling strength of a coupler of the quantum processor that corresponds to the respective edge represented by the selected one of the user-selectable icons.

Example 51. The system of Example 31 wherein, when executed by the at least one processor, the instructions cause the at least one processor further to:
 in response to a user input, present at least one popup dialog box in a window in which the graph representation is visually presented.

Example 52. The system of any of Examples 31 through 40 wherein, when executed by the at least one processor, the instructions cause the at least one processor to: present a popup qubit inspector dialog box in response to detecting a hovering or a selecting of one of the nodes, the popup qubit inspector dialog box including at least one or more of: a node or qubit identifier, a value of a variable, a bias value or a solution value, each associated with the respective node or qubit.

Example 53. The system of any of Examples 31 through 40 wherein, when executed by the at least one processor, the instructions cause the at least one processor to: present a popup coupler inspector dialog box in response to detecting a hovering or a selecting of one of the edges, the popup coupler dialog box including at least one or more of: an edge or coupler identifier, a value of a variable, a bias value, a solution value, or a chain length value, each associated with the respective edge or coupler.

Example 54. The system of any of Examples 31 through 40 wherein, when executed by the at least one processor, the instructions cause the at least one processor to: present a popup variable inspector dialog box, the popup variable inspector dialog including at least one of: a variable identifier, a variable bias value, a solution value, a chain length value, each associated with a respective variable.

Example 55. The system of any of Examples 31 through 40 wherein, when executed by the at least one processor, the instructions cause the at least one processor further to:
 present a console in a window in which the graph representation is visually presented, the console including at least one of: a warning of an anomalous condition in the first instance of the problem or the first instance of the solution to the problem, a description of the anomalous condition in the first instance of the problem or the first instance of the solution to the problem, one or more input values, or a mapping between each of a number of variables of the first instance of the problem and the qubits of the quantum processor.

Example 56. The system of any of Examples 31 through 40 wherein, when executed by the at least one processor, the instructions cause the at least one processor further to:
 cause a visual presentation of a histogram over energies in a window in which the graph representation is visually presented.

Example 57. The system of any of Examples 31 through 40 wherein the visual presentation of the graph representation includes a visual presentation of the graph with the qubits of the quantum processor represented as either points or lines.

Example 58. The system of any of Examples 31 through 40 wherein the visual presentation of the graph representation includes a visual presentation of the graph with the first instance of the problem represented as one of a force-directed graph or a linear representation of the first instance of the problem.

Example 59. The system of Examples 31 or 40 wherein, when executed by the at least one processor, the instructions cause the at least one processor further to:
for the problem,
access a representation of a second instance of the problem, the second instance representing at least one difference from the first instance of the problem;
access a representation of a second instance of a solution to the problem;
generate a graph representation with a set of nodes and edges, each of the edges extending between a respective pairs of the nodes, each of two or more of the nodes in the graph representation having corresponding problem information and corresponding solution information logically associated therewith, the corresponding problem information based at least in part on the second instance of the problem and corresponding solution information based at least in part on the second instance of the solution to the problem; and
cause a visual presentation of the graph representation including a visual representation of the nodes and the edges and the corresponding problem information and the corresponding associated solution information, the corresponding problem information and the corresponding solution information each spatially associated with the respective node in the visual presentation of the graph representation.

Example 60. The system of Examples 31 through 40 wherein, when executed by the at least one processor, the instructions cause the at least one processor to: access information readout from the quantum processor that performed at least one quantum processing operation with the first instance of the problem embedded therein.

Example 61. A method of allowing configuration and/or debugging of a quantum processor-based system that comprises a quantum processor including a plurality of qubits and a plurality of couplers, each of the couplers operable to set a coupling strength between a respective pair of the qubits, the method executable via at least one digital processor that executes processor-executable instructions and interfaces with the quantum processor-based system, the method comprising:
generating a first instance of a problem in at least one data structure, the first instance of the problem representing parameters for a first embedding of the problem in the quantum processor;
causing a visual presentation of a user interface that includes a graph representation of the first instance of the problem, the graph representation comprising a set of nodes and a set of edges, each edge extending between a respective pair of the nodes; and
receiving at least one user input via the graph representation that is visually presented, the at least one user input representative of at least one modification to the first instance of the problem; and
generating a second instance of the problem in at least one data structure based on the at least one user input received via the graph representation, the second instance of the problem representing parameters for a second embedding of the problem in the quantum processor, the second embedding based at least in part on the at least one modification to the first instance of the problem.

Example 62. The method of Example 61 wherein causing a visual presentation of a user interface that includes a graph representation of the first instance of the problem includes causing the visual presentation of the user interface that includes the graph representation of the first instance of the problem along with at least one user interface edit component, selection of which allows editing of one or more parameters or characteristics of the embedding of the problem to generate the second instance of the problem.

Example 63. The method of Example 61 wherein causing a visual presentation of a user interface that includes a graph representation of the first instance of the problem includes causing the visual presentation of the user interface that includes the graph representation of the first instance of the problem along with at least one user interface edit component, selection of which allows editing of one or more parameters or characteristics of one or more qubits of quantum processor for the embedding of the problem to generate the second instance of the problem.

Example 64. The method of Example 61 wherein causing a visual presentation of a user interface that includes a graph representation of the first instance of the problem includes causing the visual presentation of the user interface that includes the graph representation of the first instance of the problem along with at least one user interface edit component, selection of which allows editing of one or more parameters or characteristics of one or more couplers of quantum processor for the embedding of the problem to generate the second instance of the problem.

Example 65. The method of Example 61 wherein causing a visual presentation of a user interface that includes a graph representation of the first instance of the problem includes causing the visual presentation of the user interface that includes the graph representation of the first instance of the problem along with at least one user interface edit component, selection of which allows editing of one or more parameters or characteristics of one or more qubits and one or more couplers of quantum processor for the embedding of the problem to generate the second instance of the problem.

Example 66. The method of Example 61 wherein causing a visual presentation of a user interface that includes a graph representation of the first instance of the problem includes causing the visual presentation of the user interface that includes the graph representation of the first instance of the problem along with at least one user interface edit component, selection of which allows dragging and dropping hints onto one or more components of the graph representation.

Example 67. The method of Example 66 wherein generating a second instance of the problem in at least one data structure based on the least one user input received via the graph representation occurs automatically and autonomously in response to a drag and drop operation.

Example 68. The method of Example 61 wherein causing a visual presentation of a user interface that includes a graph representation of the first instance of the problem includes causing the visual presentation of the user interface where each of two or more of the nodes in the graph representation have corresponding problem information and corresponding solution information logically associated therewith, the corresponding problem information based at least in part on the first instance of the problem and corresponding solution information based at least in part on the first instance of the solution to the problem.

Example 69. The method of Example 61 wherein causing a visual presentation of a user interface that includes a graph representation of the first instance of the problem includes causing the visual presentation of the user interface where each of two or more of the nodes in the graph representation having corresponding problem information and corresponding solution information logically associated therewith, the corresponding problem information based at least in part on a first instance of the problem and corresponding solution information based at least in part on a first instance of the solution to the problem, the corresponding problem information and the corresponding solution information each spatially associated with the respective node in the visual presentation of the graph representation.

Example 70. The method of Example 69, further comprising: causing a visual presentation of a user interface that includes a graph representation of the second instance of the problem where each of two or more nodes in the graph representation of the second instance of the problem have corresponding problem information and corresponding solution information logically associated therewith, the corresponding problem information based at least in part on the second instance of the problem and corresponding solution information based at least in part on a second instance of a solution to the problem, the corresponding problem information and the corresponding solution information each spatially associated with the respective node in the visual presentation of the graph representation.

Example 71. The method of Example 61, further comprising:
performing at least one quantum processing operation with the first instance of the problem embedded therein;
reading out a first instance of a solution to the problem from the quantum processor after performing at least one quantum processing operation with the first instance of the problem embedded therein;
performing at least one quantum processing operation with the second instance of the problem embedded therein;
reading out a second instance of a solution to the problem from the quantum processor after performing at least one quantum processing operation with the second instance of the problem embedded therein; and
causing a presentation of a comparison of solution information for the first instance of the solution to the problem and for the second instance of the solution to the problem.

Example 72. The method of Example 61 wherein the nodes represent respective ones of the qubits of the quantum processor and the edges represent a communicative coupling between respective pairs of the qubits of the quantum processor that are represented by the pair of the nodes between which the respective edge extends and wherein generating a first instance of a problem in at least one data structure comprises:
generating a plurality of qubit objects, each of the qubit objects from a qubit class of objects, and having a respective identifier that uniquely identifies the qubit object from other qubit objects for the first instance of the problem, and having values for one or more qubit parameters that characterize how a respective qubit of the quantum processor will operate; and
generating a plurality of coupler objects, each of the coupler objects from a coupler class of objects, and having a respective identifier that uniquely identifies the coupler object from other coupler objects for the first instance of the problem, and having values for one or more coupler parameters that characterize how a respective coupler of the quantum processor will operate.

Example 73. The method of Example 72 wherein generating a plurality of coupler objects includes generating each of the coupler objects with a respective pair of values that represent respective ones of a pair of qubits which the coupler communicatively couples in an embedding of the first instance of the problem on the quantum processor, and a respective pair of strength values that represent a strength of the respective communicative couplings.

Example 74. The method of Examples 72 or 73 wherein generating a plurality of qubit objects includes generating each of the qubit objects with a respective value that represents a respective programmed bias state of the qubit for an embedding of the first instance of the problem on the quantum processor.

Example 75. The method of any of Examples 61 through 74, further comprising:
generating a first rendering file for the graph representation of the first instance of the problem based on a selected type of graphical representation, the first rendering file which maps a plurality of user interface elements including the nodes and the edges to respective positions in a display map.

Example 76. The method of Example 75, further comprising:
for each of the qubit objects, storing a respective logical relationship between the qubit object and a respective one of the nodes; and
for each of the coupler objects, storing a respective logical relationship between the coupler object and a respective one of the edges.

Example 77. The method of Example 76, further comprising:
in response to an input made via at least one of the nodes or the edges,
determining one or more of at least one of the qubit objects or the coupler objects that correspond to the nodes or the edges via which the input was made; and
autonomously changing a value of at least one parameter of at least one of the qubit objects or the coupler objects that correspond to the nodes or the edges via which the input was made.

Example 78. The method of Example 76, further comprising:
in response to an input made via at least one of the nodes or the edges,
determining one or more of at least one of the qubit objects or the coupler objects that correspond to the nodes or the edges via which the input was made; and
autonomously generating a replacement for at least one of the qubit objects or the coupler objects that correspond to the nodes or the edges via which the input was made.

Example 79. A system that allows configuration and/or debugging of a quantum processor-based system that comprises a quantum processor including a plurality of qubits and a plurality of couplers, each of the couplers operable to set a coupling strength between a respective pair of the qubits, the system comprising:
at least one digital processor; and
at least one nontransitory processor-readable medium that stores processor-executable instructions that, when executed by at least one digital processor, causes the at least one digital processor to:
generate a first instance of a problem in at least one data structure, the first instance of the problem representing parameters for a first embedding of the problem in the quantum processor;
cause a visual presentation of a user interface that includes a graph representation of the first instance of the problem, the graph representation comprising a set of nodes and a set of edges, each edge extending between a respective pair of the nodes; and receive at least one user input via the graph representation that is visually presented, the at least one user input representative of at least one modification to the first instance of the problem; and generate a second instance of the problem in at least one data structure based on the least one user input received via the graph representation, the second instance of the problem representing parameters for a second embedding of the problem in the quantum processor, the second embedding based at least in part on the at least one modification to the first instance of the problem.

Example 80. The system of Example 79 wherein the visual presentation of the user interface includes the graph representation of the first instance of the problem along with at least one user interface edit component, selection of which allows editing of one or more parameters or characteristics of the embedding of the problem to generate the second instance of the problem.

Example 81. The system of Example 79 wherein the visual presentation of the user interface includes the graph representation of the first instance of the problem along with at least one user interface edit component, selection of which allows editing of one or more parameters or characteristics of one or more qubits of quantum processor for the embedding of the problem to generate the second instance of the problem.

Example 82. The system of Example 79 wherein the visual presentation of the user interface includes the graph representation of the first instance of the problem along with at least one user interface edit component, selection of which allows editing of one or more parameters or characteristics of one or more couplers of quantum processor for the embedding of the problem to generate the second instance of the problem.

Example 83. The system of Example 79 wherein the visual presentation of the user interface includes the graph representation of the first instance of the problem along with at least one user interface edit component, selection of which allows editing of one or more parameters or characteristics of one or more qubits and one or more couplers of quantum processor for the embedding of the problem to generate the second instance of the problem.

Example 84. The system of Example 79 wherein the visual presentation of the user interface includes the graph representation of the first instance of the problem along with at least one user interface edit component, selection of which allows dragging and dropping hints onto one or more components of the graph representation.

Example 85. The system of Example 84 wherein the generation a second instance of the problem in at least one data structure based on the least one user input received via the graph representation occurs automatically and autonomously in response to a drag and drop operation.

Example 86. The system of Example 79 wherein the visual presentation of the user interface includes, for each of two or more of the nodes in the graph representation, corresponding problem information and corresponding solution information logically associated therewith, the corresponding problem information based at least in part on the first instance of the problem and corresponding solution information based at least in part on the first instance of the solution to the problem.

Example 87. The system of Example 79 wherein the visual presentation of the user interface includes, for each of two or more of the nodes in the graph representation, corresponding problem information and corresponding solution information logically associated therewith, the corresponding problem information based at least in part on a first instance of the problem and corresponding solution information based at least in part on a first instance of the solution to the problem, the corresponding problem information and the corresponding solution information each spatially associated with the respective node in the visual presentation of the graph representation.

Example 88. The system of Example 87 wherein, when executed by the at least one processor, the instructions cause the at least one processor further to:

cause a visual presentation of a user interface that includes a graph representation of the second instance of the problem where each of two or more nodes in the graph representation of the second instance of the problem have corresponding problem information and corresponding solution information logically associated therewith, the corresponding problem information based at least in part on the second instance of the problem and corresponding solution information based at least in part on a second instance of a solution to the problem, the corresponding problem information and the corresponding solution information each spatially associated with the respective node in the visual presentation of the graph representation.

Example 89. The system of Example 79 wherein, when executed by the at least one processor, the instructions cause the at least one processor further to:

perform at least one quantum processing operation with the first instance of the problem embedded therein;

read out a first instance of a solution to the problem from the quantum processor after performing at least one quantum processing operation with the first instance of the problem embedded therein;

perform at least one quantum processing operation with the second instance of the problem embedded therein;

read out a second instance of a solution to the problem from the quantum processor after performing at least one quantum processing operation with the second instance of the problem embedded therein; and cause a presentation of a comparison of solution information for the first instance of the solution to the problem and for the second instance of the solution to the problem.

Example 90. The system of Example 79 wherein the nodes represent respective ones of the qubits of the quantum processor and the edges represent a communicative coupling between respective pairs of the qubits of the quantum processor that are represented by the pair of the nodes between which the respective edge extends and wherein to generate a first instance of a problem in at least one data structure, the instructions, when executed by the at least one processor, cause the at least one processor to:

generate a plurality of qubit objects, each of the qubit objects from a qubit class of objects, and having a respective identifier that uniquely identifies the qubit object from other qubit objects for the first instance of the problem, and having values for one or more qubit parameters that characterize how a respective qubit of the quantum processor will operate; and generate a plurality of coupler objects, each of the coupler objects from a coupler class of objects, and having a respective identifier that uniquely identifies the coupler object from other coupler objects for the first instance of the problem, and having values for one or more coupler parameters that characterize how a respective coupler of the quantum processor will operate.

Example 91. The system of Example 90 wherein to generate a plurality of coupler objects the instructions, when executed by the at least one processor, cause the at least one processor to: generate each of the coupler objects with a respective pair of values that represent respective ones of a pair of qubits which the coupler communicatively couples in an embedding of the first instance of the problem on the quantum processor, and a respective pair of strength values that represent a strength of the respective communicative couplings.

Example 92. The system of Examples 90 or 91 wherein to generate a plurality of qubit objects the instructions, when executed by the at least one processor, cause the at least one processor to: generate each of the qubit objects with a respective value that represents a respective programmed bias state of the qubit for an embedding of the first instance of the problem on the quantum processor.

Example 93. The system of any of Examples 79 through 92 wherein, when executed by the at least one processor, the instructions cause the at least one processor further to:
generate a first rendering file for the graph representation of the first instance of the problem based on a selected type of graphical representation, the first rendering file which maps a plurality of user interface elements including the nodes and the edges to respective positions in a display map.

Example 94. The system of Example 93 wherein, when executed by the at least one processor, the instructions cause the at least one processor further to:
for each of the qubit objects, store a respective logical relationship between the qubit object and a respective one of the nodes; and
for each of the coupler objects, store a respective logical relationship between the coupler object and a respective one of the edges;
and wherein the instructions cause the at least one processor to generate a plurality of qubit objects includes generating each of the qubit objects with a respective value that represents a respective programmed bias state of the qubit for an embedding of the first instance of the problem on the quantum processor.

Example 95. The system of Example 94 wherein, when executed by the at least one processor, the instructions cause the at least one processor further to:
in response to an input made via at least one of the nodes or the edges,
determine one or more of at least one of the qubit objects or the coupler objects that correspond to the nodes or the edges via which the input was made; and
autonomously change a value of at least one parameter of at least one of the qubit objects or the coupler objects that correspond to the nodes or the edges via which the input was made.

Example 96. The system of Example 94 wherein, when executed by the at least one processor, the instructions cause the at least one processor further to:
in response to an input made via at least one of the nodes or the edges,
determine one or more of at least one of the qubit objects or the coupler objects that correspond to the nodes or the edges via which the input was made; and autonomously generate a replacement for at least one of the qubit objects or the coupler objects that correspond to the nodes or the edges via which the input was made.

Example 97. A method of providing a user interface for use with a quantum processor-based system that comprises a quantum processor including a plurality of qubits and a plurality of couplers, each of the couplers operable to set a coupling strength between a respective pair of the qubits, the method executable by at least one processor that executes processor-executable instructions, the method comprising:
generating a source graph representation of the first instance of the problem, the source graph representation including a set of nodes and edges, each of the edges extending between a respective pairs of the nodes, each of two or more of the nodes in the source graph representation representing a respective variable of a logical problem and having corresponding problem information and corresponding solution information logically associated therewith; and
generating a target graph representation of the first instance of the problem, the target graph representation including a set of nodes and edges, each of the edges extending between a respective pairs of the nodes, each of two or more of the nodes in the target graph representation representing a respective physical or logical qubit of the quantum processor; and
causing a concurrent visual presentation of the source graph representation and the target graph representation of the first instance of the problem.

Example 98. The method of Example 97 wherein each node of the source graph representation of the first instance of the problem represents both problem information and solution information for the respective variable that the node represents, and causing a concurrent visual presentation of the source graph representation and the target graph representation of the first instance of the problem include causing the current presentation with both problem and solution information visually represented for each node of the source graph representation.

Example 99. The method of Example 97, further comprising:
in response to a selection of one of the nodes of the source graph representation of the first instance of the problem,
identifying a corresponding node in the target graph representation of the first instance of the problem; and
presenting a visual identification of the corresponding node in the target graph representation of the first instance of the problem.

Example 100. The method of Example 97, further comprising:
in response to a selection of one of the nodes of the target graph representation of the first instance of the problem,
identifying a corresponding node in the source graph representation of the first instance of the problem; and
presenting a visual identification of the corresponding node in the source graph representation of the first instance of the problem.

Example 101. A system to provide a user interface for use with a quantum processor-based system that comprises a quantum processor including a plurality of qubits and a plurality of couplers, each of the couplers operable to set a coupling strength between a respective pair of the qubits, the system comprising:
- at least one processor;
- at least one nontransitory processor-readable medium that stores processor-executable instructions, which when executed by at least one processor, cause the at least one processor to:
- generate a source graph representation of the first instance of the problem, the source graph representation including a set of nodes and edges, each of the edges extending between a respective pairs of the nodes, each of two or more of the nodes in the source graph representation representing a respective variable of a logical problem and having corresponding problem information and corresponding solution information logically associated therewith; and
- generate a target graph representation of the first instance of the problem, the target graph representation including a set of nodes and edges, each of the edges extending between a respective pairs of the nodes, each of two or more of the nodes in the target graph representation representing a respective physical or logical qubit of the quantum processor; and
- cause a concurrent visual presentation of the source graph representation and the target graph representation of the first instance of the problem.

Example 102. The method of Example 101 wherein each node of the source graph representation of the first instance of the problem represents both problem information and solution information for the respective variable that the node represents.

Example 103. The method of Example 101, further comprising:
- in response to a selection of one of the nodes of the source graph representation of the first instance of the problem,
  - identify a corresponding node in the target graph representation of the first instance of the problem; and
  - present a visual identification of the corresponding node in the target graph representation of the first instance of the problem.

Example 104. The method of Example 101, further comprising:
- in response to a selection of one of the nodes of the target graph representation of the first instance of the problem,
  - identify a corresponding node in the source graph representation of the first instance of the problem; and
  - present a visual identification of the corresponding node in the source graph representation of the first instance of the problem.

CONCLUSION

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other analog processors, not necessarily the exemplary quantum processors generally described above.

For example, various techniques for transforming problems from one representation to another may be employed, including but not limited to those taught in: The Ising model: teaching an old problem new tricks, Zhengbing Bian, Fabian Chudak, William G. Macready, Geordie Rose, Aug. 30, 2010; Quantum Bridge Analytics I: A Tutorial on Formulating and Using QUBO Models, Fred Gloverl, Gary Kochenberger2, Yu Du2; D-Wave Problem-Solving Handbook, USER MANUAL 2018-10-01; and Solving the Hamiltonian Cycle Problem using a Quantum Computer, Anuradha Mahasinghe, Michael J. Dinneen, Richard Hua, Rajni Goyal, Conference Paper, January 2019 (https://www.researchgate.net/publication/330377850 Solving the Hamiltonian Cycle Problem using a Quantum Computer.)

The various implementations and/or embodiments described above can be combined to provide further implementations and/or embodiments. To the extent that they are not inconsistent with the specific teachings and definitions herein, all of the US patents, US patent application publications, US patent applications, referred to in this specification and/or listed in the Application Data Sheet and which are commonly owned by D-Wave Systems, Inc., including but not limited to U.S. Pat. No. 7,303,276; U.S. patent application Ser. No. 14/173,101, filed Feb. 5, 2014, now patent application publication no., 2014-0223224; International patent application Serial No. PCT/US2015/046393, filed Aug. 21, 2015; International patent application Serial No. PCT/US2016/015100, filed Jan. 27, 2016; International patent application Serial No. PCT/US2014/014836, filed Feb. 5, 2014, now WIPO publication number WO2014123980; U.S. patent application Ser. No. 14/339,289, filed Jul. 23, 2014, now US Patent Application Publication 2015-0032993; U.S. patent application Ser. No. 14/340,303, filed Jul. 24, 2014, now patent application publication no. 2015-0032994; U.S. patent application Ser. No. 15/448,361, filed Jul. 24, 2014, now patent application publication no. 2017-0255629; U.S. provisional patent application Ser. No. 61/858,011, filed Jul. 24, 2013; U.S. provisional patent application Ser. No. 62/040,643, filed Aug. 22, 2014, titled: SYSTEMS AND METHODS FOR PROBLEM SOLVING VIA SOLVERS EMPLOYING PROBLEM MODIFICATION; U.S. provisional patent application Ser. No. 62/040,646, filed Aug. 22, 2014, titled: SYSTEMS AND METHODS FOR PROBLEM SOLVING VIA SOLVERS EMPLOYING POST-PROCESSING THAT OVERLAPS WITH PROCESSING; U.S. provisional patent application Ser. No. 62/040,661, filed Aug. 22, 2014, titled: SYSTEMS AND METHODS FOR PROBLEM SOLVING VIA SOLVERS EMPLOYING SELECTION OF HEURISTIC OPTIMIZER(S); U.S. provisional patent application Ser. No. 62/040,890, filed Aug. 22, 2014, titled: Systems and methods for improving the performance of a quantum processor by correcting to reduce intrinsic/control errors; U.S. provisional patent application Ser. No. 62/048,043, filed Sep. 9, 2014, titled: Systems and Methods for Improving the Performance of a Quantum Processor via Reduced Readouts; U.S. provisional patent application Ser. No. 62/204,820; International patent application PCT/US2016/046611, and U.S. design patent application Ser. No. 29/725,225, filed Feb. 24, 2020, titled GRAPHICAL USER INTERFACE AND ICON FOR A DISPLAY SCREEN OR PORTION THEREOF, are incorporated herein by reference, in their entirety. Aspects of the embodiments can be modified, if necessary, to employ systems, circuits and concepts of the various patents, applications and publications to provide yet further embodiments.

These and other changes can be made to the implementations and/or embodiments in light of the above-detailed description. In general, in the following claims, the terms used should not be construed to limit the claims to the specific implementations and/or embodiments disclosed in the specification and the claims, but should be construed to include all possible implementations and/or embodiments along with the full scope of equivalents to which such claims are entitled. Accordingly, the claims are not limited by the disclosure.

The invention claimed is:

1. A method of providing a user interface for use with a quantum processor-based system that comprises a quantum processor including a plurality of physical qubits and a plurality of couplers, each of the couplers operable to set a coupling strength between a respective pair of the physical qubits, the method executable by at least one processor that executes processor-executable instructions, the method comprising:
generating a source graph representation of a first instance of a problem, the source graph representation including a set of nodes and edges, each of the edges extending between a respective pairs of the nodes, each of two or more of the nodes in the source graph representation representing a respective variable of a logical problem and having corresponding problem information and corresponding solution information logically associated therewith; and
generating a target graph representation of the first instance of the problem, the target graph representation including a set of nodes and edges, each of the edges extending between a respective pairs of the nodes, each of two or more of the nodes in the target graph representation representing a respective physical or logical qubit of the quantum processor; and
causing a concurrent visual presentation of the source graph representation and the target graph representation of the first instance of the problem.

2. The method of claim 1 wherein each node of the source graph representation of the first instance of the problem represents both problem information and solution information for the respective variable that the node represents, and causing a concurrent visual presentation of the source graph representation and the target graph representation of the first instance of the problem include causing the concurrent presentation with both problem and solution information visually represented for each node of the source graph representation.

3. The method of claim 1, further comprising:
in response to a selection of one of the nodes of the source graph representation of the first instance of the problem,
identifying a corresponding node in the target graph representation of the first instance of the problem; and
presenting a visual identification of the corresponding node in the target graph representation of the first instance of the problem.

4. The method of claim 1, further comprising:
in response to a selection of one of the nodes of the target graph representation of the first instance of the problem,
identifying a corresponding node in the source graph representation of the first instance of the problem; and
presenting a visual identification of the corresponding node in the source graph representation of the first instance of the problem.

5. The method of claim 1, wherein causing a concurrent visual presentation of the source graph representation and the target graph representation includes causing a visual representation of the nodes of the source graph representation with a visual indication that identifies a programmed bias state of a corresponding variable.

6. The method of claim 1, wherein generating a target graph representation of the first instance of the problem comprises generating a quantum processor graph in which the nodes represent respective physical qubits of the plurality of physical qubits and the edges represent respective couplers of the plurality of couplers.

7. The method of claim 6, wherein causing a concurrent visual presentation of the source graph representation and the target graph representation includes causing a visual representation of the nodes of the target graph representation with a visual indication that identifies a programmed bias state of a corresponding one of the qubits that the respective node represents.

8. The method of claim 6, further comprising:
in response to a selection of one of the nodes of the target graph representation of the first instance of the problem,
identifying a corresponding variable of the logical problem; and
presenting a visual identification of all corresponding nodes and edges in the target graph representation of the first instance of the problem that map to the corresponding variable of the logical problem.

9. The method of claim 6, wherein causing a concurrent visual presentation of the source graph representation and the target graph representation of the first instance of the problem includes causing a visual representation of the nodes with a visual anomalous condition indication that identifies an anomalous condition that has been detected.

10. The method of claim 9, wherein causing a visual presentation of the graph representation includes causing a visual representation of the nodes with a visual anomalous condition indication that indicates one or more of: a chain length specified in the first instance of the problem that exceeds a chain length threshold and an existence of a broken chain.

11. A system to provide a user interface for use with a quantum processor-based system that comprises a quantum processor including a plurality of physical qubits and a plurality of couplers, each of the couplers operable to set a coupling strength between a respective pair of the plurality of physical qubits, the system comprising:
at least one processor;
at least one nontransitory processor-readable medium that stores processor-executable instructions, which when executed by at least one processor, cause the at least one processor to:
generate a source graph representation of a first instance of a problem, the source graph representation including a set of nodes and edges, each of the edges extending between a respective pairs of the nodes, each of two or more of the nodes in the source graph representation representing a respective variable of a logical problem and having corresponding problem information and corresponding solution information logically associated therewith; and
generate a target graph representation of the first instance of the problem, the target graph representation including a set of nodes and edges, each of the edges extending between a respective pairs of the nodes, each of two or more of the nodes in the target graph representation representing a respective physical or logical qubit of the quantum processor; and cause a concurrent visual presentation of the source graph representation and the target graph representation of the first instance of the problem.

12. The system of claim 11 wherein each node of the source graph representation of the first instance of the problem represents both problem information and solution information for the respective variable that the node represents.

13. The system of claim 11, wherein the processor-executable instructions further cause the at least one processor to:

in response to a selection of one of the nodes of the source graph representation of the first instance of the problem,
identify a corresponding node in the target graph representation of the first instance of the problem; and
present a visual identification of the corresponding node in the target graph representation of the first instance of the problem.

14. The system of claim 11, wherein the processor-executable instructions further cause the at least one processor to:

in response to a selection of one of the nodes of the target graph representation of the first instance of the problem,
identify a corresponding node in the source graph representation of the first instance of the problem; and
present a visual identification of the corresponding node in the source graph representation of the first instance of the problem.

15. The system of claim 14, wherein the concurrent visual presentation of the source graph representation and the target graph representation includes a visual representation of the nodes of the source graph representation with a visual indication that identifies a programmed bias state of a corresponding variable.

16. The system of claim 14, wherein the target graph representation of the first instance of the problem comprises a quantum processor graph in which the nodes represent respective physical qubits of the plurality of physical qubits and the edges represent respective couplers of the plurality of couplers.

17. The system of claim 16, wherein the concurrent visual presentation of the source graph representation and the target graph representation includes a visual representation of the nodes of the target graph representation with a visual indication that identifies a programmed bias state of a corresponding one of the qubits that the respective node represents.

18. The system of claim 16, wherein the processor-executable instructions further cause the at least one processor to:

in response to a selection of one of the nodes of the target graph representation of the first instance of the problem,
identify a corresponding variable of the logical problem; and
present a visual identification of all corresponding nodes and edges in the target graph representation of the first instance of the problem that map to the corresponding variable of the logical problem.

19. The system of claim 16, wherein the concurrent visual presentation of the source graph representation and the target graph representation of the first instance of the problem includes a visual representation of the nodes with a visual anomalous condition indication that identifies an anomalous condition that has been detected.

20. The system of claim 19, wherein the visual presentation of the graph representation includes causing a visual representation of the nodes with a visual anomalous condition indication that indicates one or more of: a chain length specified in the first instance of the problem that exceeds a chain length threshold and an existence of a broken chain.

* * * * *